US007805518B1

(12) United States Patent
Kamvar et al.

(10) Patent No.: US 7,805,518 B1
(45) Date of Patent: Sep. 28, 2010

(54) METHOD AND SYSTEM FOR REPUTATION MANAGEMENT IN PEER-TO-PEER NETWORKS

(75) Inventors: Sepandar D. Kamvar, San Francisco, CA (US); Mario T. Schlosser, Hochhein am Main (DE)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 1622 days.

(21) Appl. No.: 10/989,293

(22) Filed: Nov. 15, 2004

Related U.S. Application Data

(60) Provisional application No. 60/520,461, filed on Nov. 14, 2003.

(51) Int. Cl.
*G06F 15/16* (2006.01)
(52) U.S. Cl. .................. 709/227; 709/245; 709/237
(58) Field of Classification Search .................. 709/201, 709/224, 202, 226, 230, 225, 220, 245, 249, 709/227, 237; 370/349
See application file for complete search history.

(56) References Cited

U.S. PATENT DOCUMENTS

| 7,065,579 B2* | 6/2006 | Traversat et al. | 709/230 |
| 7,167,920 B2* | 1/2007 | Traversat et al. | 709/230 |
| 7,197,565 B2* | 3/2007 | Abdelaziz et al. | 709/226 |
| 7,213,047 B2* | 5/2007 | Yeager et al. | 709/202 |
| 7,308,496 B2* | 12/2007 | Yeager et al. | 709/224 |
| 7,340,500 B2* | 3/2008 | Traversat et al. | 709/201 |
| 2008/0289023 A1* | 11/2008 | Wardrop | 726/9 |

OTHER PUBLICATIONS

Aberer, K., et al., "Managing Trust in a Peer-2-Peer Information System," *Proceedings of the 10th Int'l Conf on Information and Knowledge Management*, (ACM CIKM), New York, 2001.
"Advagato's Trust Metric" (White Paper), http://www.advogato.org/trust-metric.html.
Aura, T., et al., "DOS-Resistant Authentication with Client Puzzles," *8th Int'l Workshop on Security Protocols*, 2000.
Beth, T., et al., "Valuation of Trust in Open Networks," *Proceeding of 3rd European Symposium on Research in Computer Security (ESORICS '94)*, 1994, pp. 3-18.
"Captcha Project," http://www.captcha.net.
Cornelli, F., et al., "Choosing Reputable Servents in a P2P Network," *Proceedings in the 11th World Wide Web Conf*, Hawaii, May 2002.
Crespo, A., et al., "Semantic Overlay Networks for P2P Systems," Technical report, Stanford University, Oct. 2002.

(Continued)

*Primary Examiner*—Brenda Pham
(74) *Attorney, Agent, or Firm*—DeMont & Breyer, LLC

(57) ABSTRACT

Methods to minimize the impact of malicious peers on the performance of a peer-to-peer system. The system computes a global trust value for a peer by calculating the left principal eigenvector of a matrix of normalized local trust values, thus taking into consideration the entire system's history with each single peer. Algorithms for performing such computations in a scalable and distributed manner are provided. Rewarding highly reputable peers with better quality of service encourages non-malicious peers to share more information and to self-police their own information.

12 Claims, 11 Drawing Sheets

OTHER PUBLICATIONS

Douceur, J., "The Sybil Attack," *1st IPTPS*, Mar. 2002.

Haveliwala, T., et al., "The Second Eigenvalue of the Google Matrix," Technical report, Stanford University, 2003.

Kamvar, S., et al., "Secure Score Management for P2P Systems," Technical report, Stanford University, 2003.

Kamvar, S., et al., "Incentives for Combatting Freeriding on P2P Networks," Technical report, Stanford University, 2003.

Page, L., et al., "The PageRank Citation Ranking: Bringing Order to the Web," Technical report, Stanford University, 1998.

Ratnasamy, P., et al., "A Scalable Content-Addressable Network," *Proceedings of ACM SIGCOMM*, Aug. 2001.

Resnick, P., et al., "Reputation Systems," *Communications of the ACM*, vol. 43, No. 12, 2000, pp. 45-48.

Ripeanu, M., et al., "Mapping the Gnutella Network—Macroscopic Properties of Large-Scale P2P Networks and Implications for System Design," Internet Computing Journal, vol. 6, No. 1, 2002.

Saroiu, S., et al., "A Measurement Study of Peer-to-Peer File Sharing Systems," *Proceedings of Multimedia Computing and Networking 2002 (MCCN '02)*, San Jose, CA, Jan. 2002.

Stoica, I., et al., "Chord: A Scalable Peer-to-Peer Lookup Service for Internet Applications," *Proceedings of the 2001 Conf on Applications, Technologies, Architectures, and Protocols for Computer Communications*, ACM Press, 2001, pp. 149-160.

\* cited by examiner

Figure 1A

|     | Bob | Sue | Joe | Ben |
|-----|-----|-----|-----|-----|
| Bob | 20  | 7   | 11  | 4   |
| Sue | 473 | 500 | 0   | 12  |
| Joe | 5   | 27  | 30  | 3   |
| Ben | 0   | 0   | 0   | 1   |

|     | Bob | Sue | Joe | Ben |
|-----|-----|-----|-----|-----|
| Bob | .45 | .17 | .26 | .02 |
| Sue | .49 | .50 | 0   | .01 |
| Joe | .08 | .42 | .46 | .04 |
| Ben | 0   | 0   | 0   | 1   |

|     | Bob | Sue | Joe | Ben |
|-----|-----|-----|-----|-----|
| Bob | .45 | .49 | .08 | 0   |
| Sue | .17 | .50 | .42 | 0   |
| Joe | .26 | 0   | .46 | 0   |
| Ben | .02 | .01 | .04 | 1   |

$\vec{c}_i$ Joe

| .08 |
| .42 |
| .46 |
| .04 |

=

$\vec{t}_i$

| .28 | Bob |
| .64 | Sue |
| *   | Joe |
| .02 | Ben |

Figure 1C

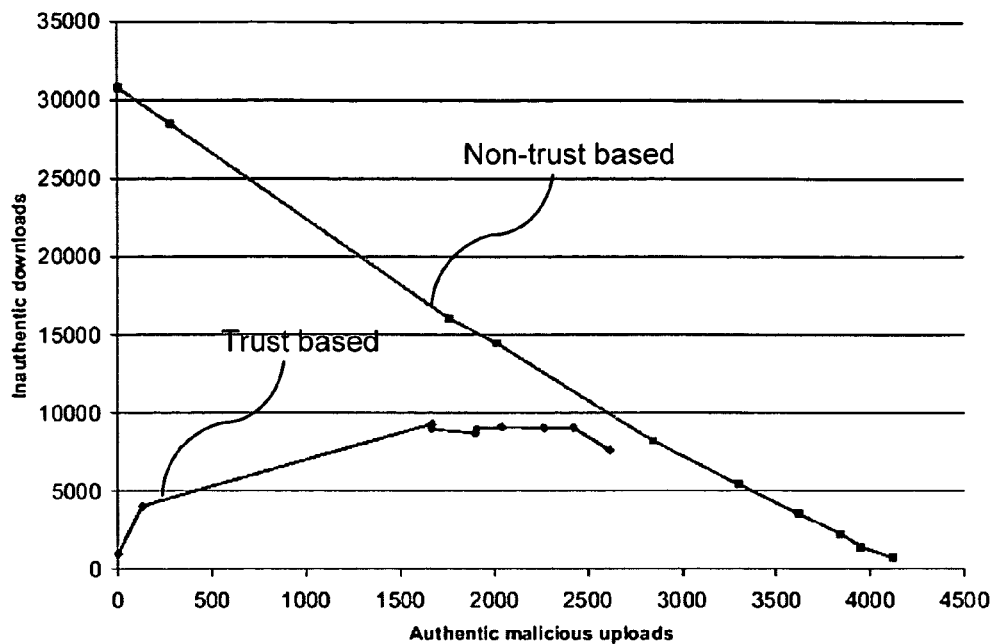

Figure 12 foreach *peer i* do
    Submit local trust values $\vec{c_i}$ to all score managers at positions $h_m(pos_i)$, $m = 1 \ldots M - 1$;
    Collect local trust values $\vec{c_d}$ and sets of acquaintances $B_d^i$ of daughter peers $d \in D_i$;
    Submit daughter $d$'s local trust values $c_{dj}$ to score managers $h_m(pos_d)$, $m = 1 \ldots M - 1, \forall j \in B_d^i$;
    Collect acquaintances $A_d^i$ of daughter peers;
    foreach *daughter peer* $d \in D_i$ do
        Query all peers $j \in A_d^i$ for $c_{jd}p_j$;
        repeat
            Compute $t_d^{(k+1)} = (1 - a)(c_{1d}t_1^{(k)} + c_{2d}t_2^{(k)} + \ldots + c_{nd}t_n^{(k)}) + ap_d$;
            Send $c_{dj}t_d^{(k+1)}$ to all peers $j \in B_d^i$;
            Wait for all peers $j \in A_i^d$ to return $c_{jd}t_j^{(k+1)}$;
        until $|t_d^{(k+1)} - t_d^{(k)}| < \epsilon$;
    end
end

METHOD AND SYSTEM FOR REPUTATION MANAGEMENT IN PEER-TO-PEER NETWORKS

RELATED APPLICATION

This application claims priority to U.S. Provisional Patent Application Ser. No. 60/520,461, filed Nov. 14, 2003, which is incorporated by reference herein in its entirety.

STATEMENT REGARDING FEDERALLY SPONSORED RESEARCH OR DEVELOPMENT

This invention was made with Government support under contract 9817799 awarded by the National Science Foundation. The Government has certain rights in this invention.

TECHNICAL FIELD

The invention relates generally to reputation management in peer-to-peer networks. More particularly, the invention is directed to methods for establishing individual global trust values for peers in a peer-to-peer network based on peer-to-peer interaction and applications of such global trust values.

BACKGROUND

Peer-to-peer (P2P) networks, such as file-sharing networks, social networks (e.g. www.friendster.com), and e-mail exchange between peers (e.g., mailing lists), are currently receiving attention as a means of sharing and distributing information. In fact, peer-to-peer file-sharing networks have many benefits over standard client-server approaches to data distribution, including improved robustness, scalability, and diversity of available data. However, the open nature of these networks makes them sensitive to disruption by malicious peers. For instance, a file-sharing network can be disrupted when one or more peers in the network self-replicate inauthentic files, a social network can be disrupted when peers do not profile themselves accurately or use the network to harass others in the network, and an e-mail exchange can be disrupted by excessive unwanted e-mail (e.g., spam). Attacks by anonymous malicious peers have been observed on today's popular peer-to-peer networks. For example, malicious users have used these networks to introduce viruses such as the VBS.Gnutella worm, which spreads by making a copy of itself in a peer's Gnutella program directory, then modifying the Gnutella.ini file to allow sharing of .vbs files. Far more common have been inauthentic file attacks, wherein malicious peers respond to virtually any query providing 'decoy files' that are tampered with or do not work.

It has been suggested that the future development of P2P systems will depend largely on the availability of novel methods for ensuring that peers obtain reliable information on the quality of resources they are receiving. See Cornelli et al., "Choosing Reputable Servants in a P2P Network," Proceedings of the 11th World Wide Web Conference, Hawaii, USA, May 2002. In this context, attempting to identify malicious peers (e.g. peers that provide inauthentic files, send spam) is superior to attempting to identify inauthentic files or unwanted e-mail, since malicious peers can easily generate a virtually unlimited number of inauthentic files or unwanted e-mail messages if they are not banned from participating in the network.

Reputation management systems have been used to identify malicious events in a centralized system. An example of a successful reputation management is the online auction system eBay (www.ebay.com). In eBay's reputation system, buyers and sellers can rate each other after each transaction, and the overall reputation of a participant is the sum of these ratings over the last six months. This system relies on a centralized system to store and manage these ratings.

In a distributed environment, such as a peer-to-peer network, peers can still rate each other after each transaction, as in the eBay system. For example, each time peer i receives information from peer j (e.g., a file, e-mail message, or other type of data) it can rate the transaction as positive ($tr(i,j)=1$) or negative ($tr(i,j)=-1$). Peer i can rate a transaction as negative, for example, if a file downloaded from j is not authentic, is tampered, or if the transaction is interrupted. Like in the eBay model, a local trust value $S_{ij}$ can be defined as the sum of the ratings of the individual transactions that peer i has had with peer j, $S_{ij} = \Sigma tr_{ij}$.

Equivalently, each peer i can store the number of satisfactory transactions it has had with peer j, $sat(i,j)$ and the number of unsatisfactory transactions it has had with peer j, $unsat(i,j)$. Then, $S_{ij}$ is defined:

$$S_{ij} = sat(i,j) - unsat(i,j) \quad (1)$$

Previous work in P2P reputation systems has been based on such notions of local trust values. See, for example, Cornelli et al., "Choosing Reputable Servants in a P2P Network," Proceedings of the 11th World Wide Web Conference, Hawaii, USA, May 2002; Aberer and Despotovic, "Managing Trust in a Peer-2-Peer Information System," Proceedings of the 10th International Conference on Information and Knowledge Management (ACM CIKM), New York, 2001. The challenge for reputation systems in a distributed environment is how to aggregate the local trust values $S_{ij}$ without a centralized storage and management facility. While each of the previous systems cited above addresses this issue, they suffer from one of at least two drawbacks. Either they aggregate the ratings of only a few peers and therefore don't get a wide view about a peer's reputation, or they aggregate the ratings of all the peers and congests the network with system messages asking for each peer's local trust values at every query.

Accordingly, effective systems and methods for aggregating local trust values in without a centralized storage and management facility in order to establish useful global trust values would be highly desirable.

SUMMARY

A method is presented where each peer i in the network is assigned a unique global trust value that reflects the experiences of all peers in the network with peer i. The method is not dependent upon a centralized storage and management facility. In this approach, all or a portion of the peers in the network participate in computing these values in a distributed and node-symmetric manner with minimal overhead on the network. Methods are described for ensuring the security of the computations, thereby minimizing the probability that malicious peers in the system can lie to their own benefit. Methods are also described for using these values to identify peers that provide material deemed inappropriate by the users of a peer-to-peer network and to effectively isolate them from the network.

One embodiment of the invention provides an algorithm, used in the context of a information-sharing (e.g., file-sharing) peer-to-peer network, that decreases the number of downloads of inauthentic information in the network by assigning each peer a unique global trust value, based on the peer's history of information sharing (e.g., uploads). A distributed and secure method of computing these global trust values, based on Power iteration, is provided. By having peers use these global trust values to choose the peers from whom they receive information, the network effectively identifies malicious peers and isolates them from the network. Simulations of the inventive methods show that assignment of global trust values to peers in a network significantly decreases the disruption caused by malicious peers, even under a variety of conditions where malicious peers cooperate in an attempt to deliberately subvert the system.

BRIEF DESCRIPTION OF THE DRAWINGS

The aforementioned aspects of the invention as well as additional aspects will be more clearly understood as a result of the following detailed description of the various embodiments of the invention when taken in conjunction with the drawings. Like reference numerals refer to corresponding parts throughout the several views of the drawings.

FIG. 1 depicts exemplary trust matrices for an exemplary peer-to-peer network in accordance with some embodiments of the present invention.

FIG. 12 illustrates inauthentic downloads versus authentic uploads provided by malicious peers with trust-based and non-trust based download source selection in a network populated by type D and type B peers in accordance with some embodiments of the present invention.

FIG. 13 is an algorithm (algorithm 4) in accordance with some embodiments of the present invention.

DETAILED DESCRIPTION OF EMBODIMENTS

Figure 2:
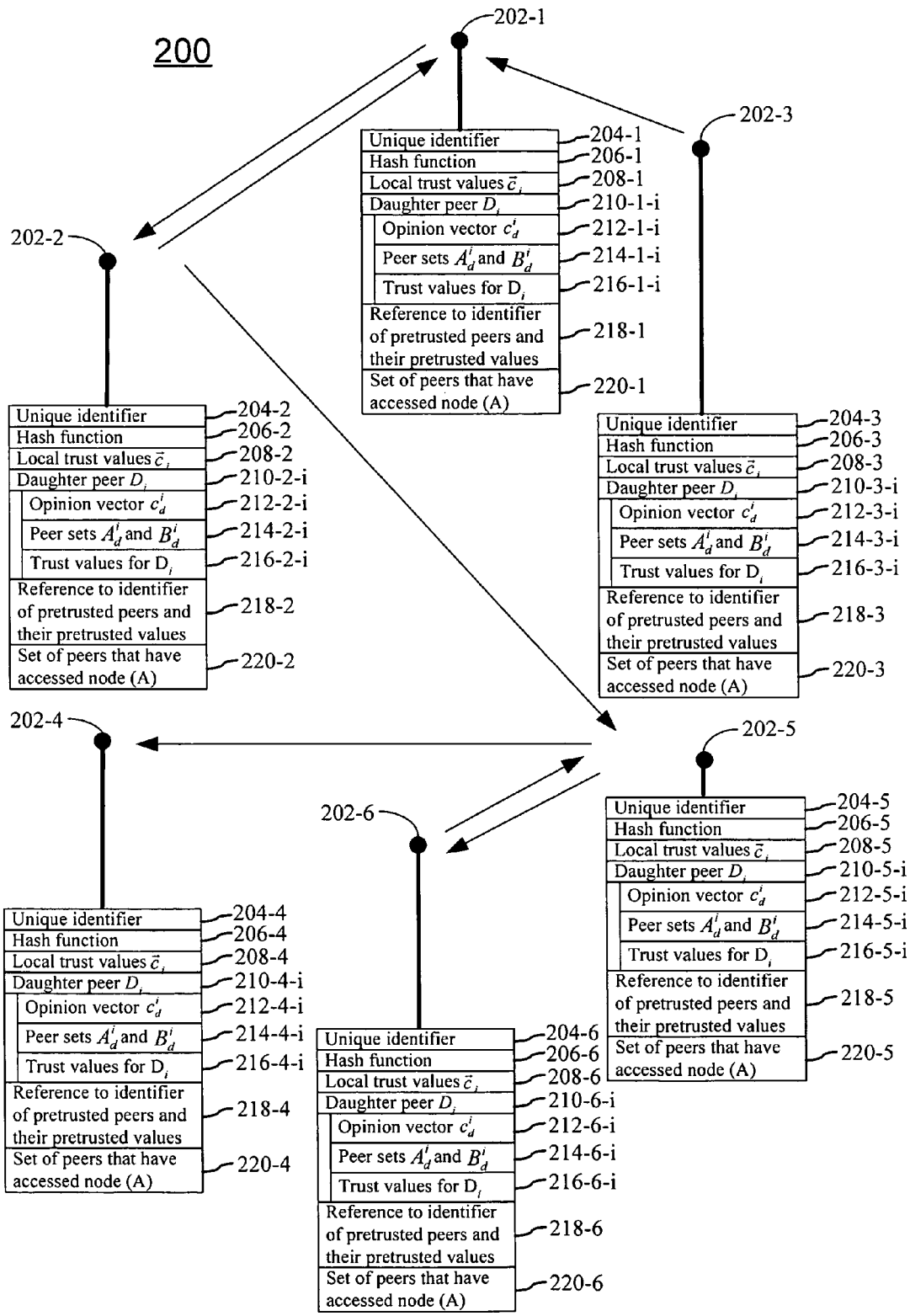
FIG. 2 depicts a peer-to-peer network and data structures stored in each peer in accordance with some embodiments of the present invention.

There are five design criteria that are considered important in P2P reputation systems of the present invention. First, the system should be self-policing. That is, the shared ethics of the user population are defined and enforced by the peers themselves and not by some central authority. Second, the system should maintain anonymity. That is, a peer's reputation should be associated with an opaque identifier (such as the peer's Gnutella username) rather than with an externally associated identity (such as a peer's IP address). Third, the system should not assign any profit to newcomers. That is, reputation should be obtained by consistent good behavior through several transactions, and it should not be advantageous for malicious peers with poor reputations to continuously change their opaque identifiers to obtain newcomers status. Fourth, the system should have minimal overhead in terms of computation, infrastructure, storage, and message complexity. Fifth, the system should be robust to malicious collectives of peers who know one another and attempt to collectively subvert the system.

One embodiment of the present invention provides a reputation system that aggregates the local trust values of all of the users in a natural manner, with minimal overhead in terms of message complexity. The approach is based on the notion of transitive trust: a peer i will have a high opinion of those peers who have provided it useful information (e.g., authentic files, e-mail, or other form of useful and/or reliable data). Moreover, peer i is likely to trust the opinions of those peers, since peers who are honest about the information they provide are also likely to be honest in reporting their local trust values.

This aspect of the invention is based on the discovery that transitive trust leads to a system where global trust values correspond to the left principal eigenvector of a matrix of normalized local trust values. This eigenvector computation can be performed in a distributed manner with minimal coding, where the message complexity is provably bounded and empirically low. Most importantly, this system is highly effective in decreasing the number of unsatisfactory network events (e.g., downloads), even when up to seventy percent or more of the peers in the network form a malicious collective in an attempt to subvert the system.

Normalizing Local Trust Values. In order to aggregate local trust values, it is typically necessary to normalize them in some manner. Otherwise, malicious peers can assign arbitrarily high local trust values to other malicious peers, and arbitrarily low local trust values to good peers, thereby subverting the network. A normalized local trust value, $c_{ij}$ (read as i's trust in j) is defined as follows:

$$c_{ij} = \frac{\max(s_{ij}, 0)}{\sum_j \max(s_{ij}, 0)} \quad (2)$$

This ensures that all values will be between 0 and 1 and that a peer's normalized rankings for other peers will sum to 1. For instance, consider the matrix of local trust values 102 for the network consisting of nodes Bob, Sue, Joe, and Ben, illustrated in FIG. 1A, before normalization using equation 2. Each column in matrix 102 represents the rankings of a member of the network by others in the network. For example, Sue ranks Bob with a rating 473 while Joe and Ben respectively give Bob a ranking of 5 and 0. Because the trust values have not been normalized, Sue's ranking of Bob would dominate over the ranking assigned to Bob by Joe and Ben if the raw ratings were used. A value in the leading diagonal of matrix 102 represents how highly a node in the network trusts itself. For example, using FIG. 1A, one value in the leading diagonal represents how much Bob trusts himself. However, in some embodiments, each value in the leading diagonal of normalized matrix 104 is assigned a "0" (and are not used during aggregation of local trust values) or a "1" (and are used during aggregation of local trust values). A "1" means that the node trusts itself, and may be substituted with the maximum trust value for that node. The case where each value in the leading diagonal of the normalized matrix receives a "1", e.g., the maximum value for that node, (and are used in aggregation of local trust values) is illustrated in FIG. 1B.

FIG. 1B shows matrix 104, which is the trust values of matrix 102 after normalization using equation 2. To illustrate how values in matrix 104 are determined, consider Bob's ranking of others in matrix 102. Bob gave himself a ranking a 20, Sue a ranking of 7, Joe a ranking of 11, and Ben a ranking of 4. Thus, after normalization, Bob's ranking of himself is 20/(20+7+11+4), or 0.45, Bob's ranking of Sue is 7/(20+7+11+4), or 0.14, Bob's ranking of Joe is 11/(20+7+11+4), or 0.26, and Bob's ranking of Ben is 4/(20+7+11+4), or 0.02. Notice that if $\Sigma_j \max(s_{ij})=0$, then $c_{ij}$ is undefined. This case is addressed below.

There are some drawbacks to normalizing in the manner illustrated in FIG. 1. For one, the normalized trust values do not distinguish between a peer with whom peer i did not interact and a peer with whom peer i has had poor experience. Also, these $c_{ij}$ values are relative, and there is no absolute interpretation. That is, if $c_{ij}=c_{ik}$, peer j has the same reputation as peer k in the eyes of peer i, but it is not known if both of them are very reputable, or if both of them are mediocre. However, substantially good results are achieved using this normalization algorithm despite these drawbacks mentioned. In one embodiment of the invention, normalized local trust values are chosen in this manner because they allow for the computation described in detail below without renormalizing the global trust values at each iteration. Such a computation is potentially costly in a large distributed environment.

Aggregating Local Trust Values. To be useful, normalized local trust values are aggregated. To accomplish this in a distributed environment, peer i asks its acquaintances (j) about their opinions of other peers. In one embodiment of the invention, the opinions of is peers is weighted by the trust peer i places in them:

$$t_{ik} = \sum_j c_{ij} c_{jk} \quad (3)$$

where $t_{ik}$ represents the trust that peer i places in peer k based on asking his friends j (and where $c_{ij}$ is read as "the opinion i has in j" and $c_{jk}$ is read "the opinion j has in k") To illustrate using matrix 104, consider the case in which Joe is interested in finding out the ranking of Sue. Reading across the row denoted "Sue", it is seen that Bob has given Sue a normalized local trust value of 0.17, Joe has given Sue a normalized trust value of 0.42, and Ben has given Sue a normalized local trust value of 0. Thus, the aggregated local trust value becomes:

A*(0.77)+B*(0.42)+C*(0)

where A is the local trust value that Joe has given to Bob, B is the "self local trust value" of Joe (1 in this case, but in some embodiments 0), and C is the local trust value that Joe has given to Ben. Reading values A, B, and C from the row entitled "Joe", the aggregated local trust value for Sue is:

0.08*(0.17)+0.46*(0.77)+0.04*(0)=0.64

In embodiments where only the opinions of Joe's neighbors are considered and not Joe's opinion, the aggregated local trust value of Sue by Joe becomes:

0.08*(0.17)+0*(0.42)+0.04*(0)=0.24

The aggregation algorithm can be written in matrix notation. Define C to be the matrix $[c_{ij}]$ (matrix 104), $\vec{c}$, to be the vector containing the values $c_{ik}$ (e.g., for Joe's opinion of other members of the matrix illustrated in FIG. 1, $\vec{c}_i$, is the row in matrix 104 denoted "Joe"), and $\vec{t}$, to be the vector containing the values $t_{ik}$ (e.g., the vector containing the computed local trust values that Joe has in peers Bob, Sue, and Ben). Then $\vec{t}_i = C^T \vec{c}_i$. (Note that $\Sigma_i t_{ij}=1$ as desired). FIG. 1C illustrates this for the case where i is Joe and where, for any given computation of $t_{ik}$, k's trust value is not used. This is a useful way to have each peer gain a view of the network that is wider than his own experience. However, the trust values stored by peer i still reflect only the experience of peer i and his acquaintances. In order to get a wider view, peer i may wish to ask his friends' friends ($t=(C^T)^2 c_i$. If he continues in this manner, ($t=(C^T)^n c_i$), he will have a complete view of the network after n=large iterations (under the assumption that C is irreducible and aperiodic, a topic addressed below). Fortunately, when n becomes large, the trust vector $\vec{t}_i$ converges to the same vector for every peer i in matrix C. Namely, this vector $\vec{t}$ i will be the principle left eigenvector of the matrix C. This concept is best explained by reviewing the properties of matrices. Multiplication of matrix C by a vector normally changes the direction of the vector. However, for certain exceptional vectors $\vec{x}$ (termed eigenvectors), $C\vec{x}$ is a multiple of $\vec{x}$. This property can be described by the basic equation $C\vec{x} = \lambda \vec{x}$. See, for example, Strang, 1986, *Introduction to Applied Mathematics*, Wellesley-Cambridge Press, in particular pp. 47-67, which is hereby incorporated by reference in its entirety. The number $\lambda$ is the eigenvalue, which tells whether the corresponding eigenvector $\vec{x}$ is stretched, contracted, or reversed by C. For P2P networks, C will typically have multiple eigenvectors. The eigenvector with the largest eigenvalue (the largest value $\lambda$ in the relationship $C\vec{x} = \lambda \vec{x}$) is termed the principle left eigenvector of C. The value $\vec{t}_i$ will converge to this principal eigenvector of C. As such, $\vec{t}$ can be considered a global trust vector for C. Its elements, $t_j$, quantify how much trust the system as a whole places on peer j.

Basic Algorithm. A matrix of trust values C for a network has been described. Further, aggregation of local trust values from neighbors in order to determine the local trust values $t_{ik}$ of each node k in a network have been introduced. It was pointed out that when a sufficient number of neighbors j are consulted by node i, the local trust values of nodes in the network, expressed as the vector $\vec{t}_i$ having elements $t_{ik}$, will be the same for every node i in matrix C. In other words the vector $\vec{t}_i$ will converge on the principal eigenvector of C. The principal eigenvector of C can be determined by a variety of techniques and all such techniques are within the scope of the present invention. In one embodiment of the present invention, power method techniques for eigenvalues (power method) are used to determine the principal eigenvector of C. Power method techniques for eigenvalues are described in, for example, Strang, 1986, *Introduction to Applied Mathematics*, Wellesley-Cambridge Press, in particular pp. 412-414, which is hereby incorporated by reference in its entirety.

At first, for ease of introduction of the various aspects of the present invention, a determination of the principal eigenvector of C that ignores the distributed nature of the peer-to-peer network will be described. Thus, it will be assumed that some central server knows all the $c_{ij}$ values of matrix C and performs all necessary computations. Once this basic algorithm has been introduced, it will be shown how the computation can advantageously be performed in a distributed environment. To solve for the principal eigenvector of C, the computation $\vec{t} = (C^T)^n \vec{e}$ is performed where n is large. Previously, it was stated that the desired computation was $\vec{t} = (C^T)^n \vec{c}_i$, where $\vec{c}_i$ is the normalized local trust vector of some peer i. However, since they both converge to the principal left eigenvector of C, $\vec{e}$, which can be an arbitrary vector, can be used instead of $\vec{c}_i$. The algorithm can be written as Algorithm 1:

$\vec{t}^{(0)} = \vec{e}$;

repeat $\vec{t}^{(k+1)} = C^T \vec{t}^{(k)}$;

$\delta = \|t^{(k+1)} - t^k\|$;

until $\delta < \epsilon$;

That is to say, $\vec{t}$ (the global trust value of each peer i in matrix C) is assigned some random vector, which is then multiplied by $C^T$ until $\vec{t}$ converges, at which point $\vec{t}$ at least approximates the principal eigenvector of C.

Practical Issues. There are three issues that are not addressed by the algorithm described above: a priori notions of trust, inactive peers, and malicious collectives. These notions will be discussed in turn. Often, there are some peers in the network that are known to be trustworthy. For example, the first few peers to join a network are often known to be trustworthy, since the designers and early users of a P2P network are likely to have less motivation to destroy the network they built. The present invention advantageously incorporates such notions of trust in a natural and seamless manner by defining some distribution $\vec{p}$ over pre-trusted peers. For example, if some set of peers P is known to be trusted, $p_i$ can be defined as $1/|P|$ if $i \in P$, and $p_i = 0$ otherwise, where $|P|$ is the number of peers in the set of peers P. A description of how the $\vec{p}$ can be used follows.

First (a priori notions of trust), in the presence of malicious peers, $\vec{t} = (C^T)^n \vec{p}$ will generally converge faster than $t = (C^T)^n \vec{e}$, so $\vec{p}$ can be used as the start vector. Second (inactive peers), consider the case in which peer i doesn't download from anybody else, or if it assigns a zero score to all other peers. Then $C_{ij}$ from Equation 2 will be undefined. In this case, $c_{ij}$ can be set to $p_j$ and Equation 2 can be redefined as:

$$c_{ij} = \begin{cases} \frac{\max(s_{ij}, 0)}{\sum_j \max(s_{ij})} & \text{if } \sum_j \max(s_{ij}) \neq 0; \\ p_j & \text{otherwise.} \end{cases}$$

That is, if peer i doesn't know anybody, or doesn't trust anybody, he will choose to trust the pre-trusted peers. Third (malicious collectives), in peer-to-peer networks, there is potential for malicious collectives to form. See, for example, Douceur, "The Sybil Attack", First IPTPS, March 2002. A malicious collective is a group of malicious peers who know each other, who give each other high local trust values and give all other peers low local trust values in an attempt to subvert the system and gain high global trust values. In the present invention, this issue is addressed by taking:

$$\vec{t}^{(k+1)} = (1-a) C^T \vec{t}^{(k)} + a \vec{p} \qquad (5)$$

where a is some constant less than 1. This is equivalent to setting the opinion vector for all peers to be $\vec{c}_i = (1-a)\vec{c}_i + a\vec{p}$, thereby breaking collectives by having each peer place at least some trust in the peers P that are not' part of a collective. In one example, a is 0.05. However, other values of a are possible (e.g. a between 0.01 and 0.8, a between 0.001 and 0.99, etc.). Viewed probabilistically, this is equivalent to saying that an agent that is crawling a network by a probabilistic model is less likely to get stuck crawling a malicious collective because at each step, he has a certain probability (e.g., 5% when a is equal to 0.05) of crawling to a pre-trusted peer. This also makes the matrix C irreducible and aperiodic, guaranteeing that the computation will converge. Thus, a modification of Algorithm 1 that incorporates these principles can be written as Algorithm 2:

$\vec{t}^{(0)} = \vec{p}$;

repeat $\vec{t}^{(k+1)} = C^T \vec{t}^{(k)}$;

$\vec{t}^{(k+1)} = (1-a) \vec{t}^{(k+1)} + a \vec{p}$;

$\delta = \|t^{(k+1)} - t^k\|$;

until $\delta < \epsilon$;

The pre-trusted peers are used in Algorithm 2. They guarantee convergence and break up malicious collectives. Therefore, the choice of pre-trusted peers is important. In particular, it is important that no pre-trusted peer be a member of a malicious collective. This would compromise the quality of Algorithm 2. To avoid this, the system can choose a very few number of pre-trusted peers (for example, the designers of the network).

Distributed computation. The discussion above assumes that C is available in a centralized location. However, as outlined in the background section, this assumption does not hold in a peer-to-peer network. Accordingly, to be fully advantageous, the novel algorithms presented above need to be computed in a distributed system with minimal peer-to-peer communication. Accordingly, one aspect of the invention provides an algorithm where all peers in the network cooperate to compute and store the global trust vector, and the computation, storage, and message overhead for each peer are minimal.

In a distributed environment, the first challenge that arises is how to store C and t. It has been indicated above that each peer can store its local trust vector E, (that is, a vector that stores the degree of trust i has in every other node j in the peer-to-peer network). Ignoring security issues, when each peer further stores its own global trust value 7, each peer can compute its own global trust value:

$$t_i^{(k+1)}=(1-a)(c_1t_1^{(k)}+\ldots+c_{ni}t_n^{(k)})+ap_i \qquad (6)$$

Equation 6 is the component-wise version of Equation 5 ($\vec{t}^{(k+1)}=(1-a)C^T\vec{t}^{(k)}+a\vec{p}$). Notice that, since peer i has had limited interaction with other peers, many of the components in Equation 6 will be zero. This lends itself to the simple distributed Algorithm 3:

DEFINITIONS $A_i$: set of peers that have downloaded files from peer i
$B_i$: set of peers from which peer i has downloaded files
Algorithm
Each peer i do {
   Query all peers j∈$A_i$ for $\vec{t}_j^{(0)}=\vec{p}_j$;
   repeat
      Compute $t_i^{(k+1)}=(1-a)(c_{1i}t_1^{(k)}+c_{2i}t_2^{(k)}+\ldots+c_{ni}t_n^{(k)})+ap_1$;
      Send $c_{ij}t_1^{(k+1)}$ to all peers j ∈ $B_i$;
      $\delta=\|t^{(k+1)}-t^k\|$;
      Wait for all peers j ∈ $A_i$ to return $c_{ji}t_j^{(k+1)}$;
   until $\delta<\epsilon$;

In other words, each peer initializes the cycle by obtaining trusted values $\vec{p}_j$. Then, each peer computes its own global trust value $t_i^{(k+1)}$ (and, for each j ∈ $B_i$, sends its updated global trust value $t^{(k+1)}$ weighted by the measure of trust it has in j (hence $c_{ij}t_1^{(k+1)}$). Next, a test is made to determine if i's global trust value has converged, $\delta=\|t^{(k+1)}-t^k\|$. Then, before a new cycle in the repeat loop can be computed, i waits for all peers j ∈ $A_i$ to return their updated global trust values weighted by their confidence in i ($C_{ij}t_j^{*k+1}$).

Two things should be noted. First, only the pre-trusted peers need to know their $p_i$. This means that pre-trusted peers can remain anonymous; nobody else needs to know that they are pre-trusted. Recall that, for the moment, the assumption that peers are honest and report their own trust values is made, including whether or not they are a pre-trusted peer. One may imagine that pre-trusted peers can be identified because they have high global trust values. However, simulations show that, while the pre-trusted peers have above average $t_i$ values, they rarely have the highest values of $t_i$. Second, in most P2P networks, each peer has limited interaction with other peers. There are two benefits to this. First, the computation $t_i^{(k+1)}= (1-a)(c_{1i}t_i^{(k)}+\ldots+c_{ni}t_n^{(k)})+ap_i$ is not intensive, since most $c_{ji}$ are zero. Second, the number of messages passed is small, since $A_i$ and $B_i$ are small. In the case where a network is full of heavily active peers, the number of local trust values $c_{ji}$ that each peer can report can be limited in order to reduce algorithm overhead.

Figure 4:
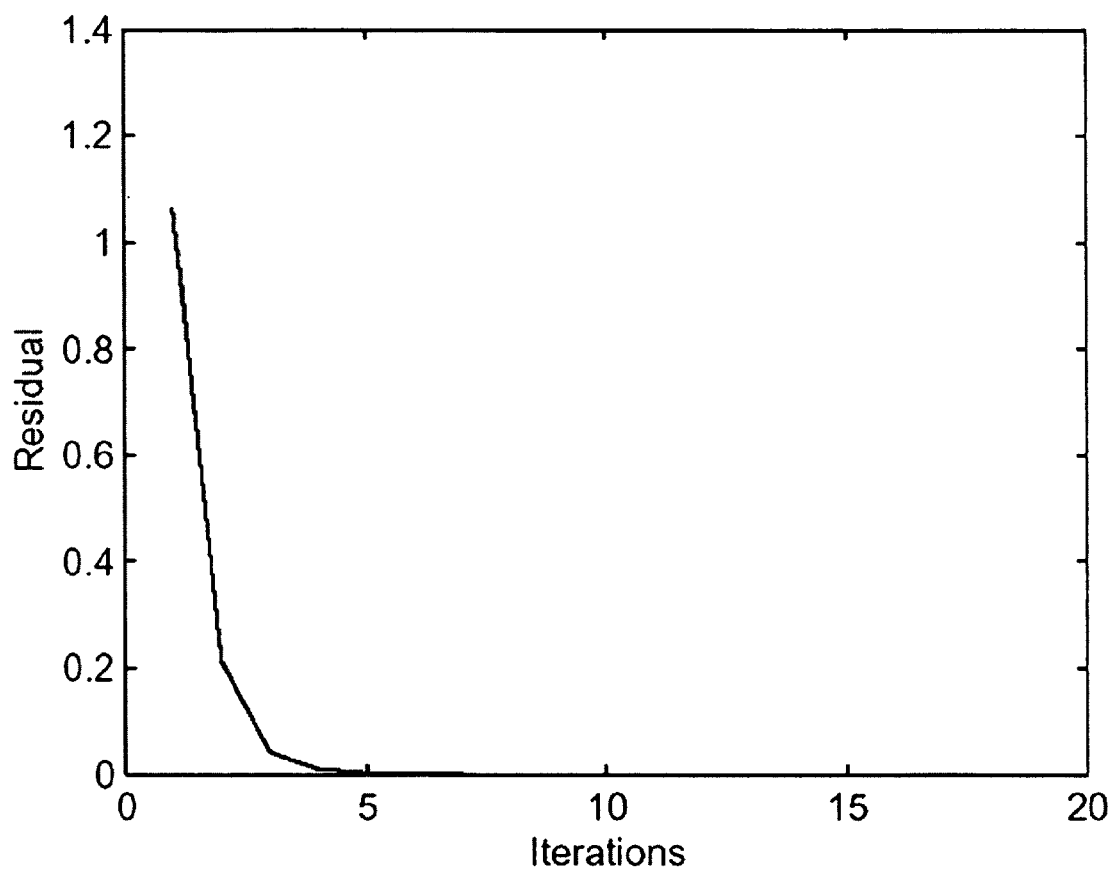
FIG. 4 illustrates how a global trust value for a given node i converges in less than ten iterations using a method in accordance with some embodiments of the present invention.

Algorithm Complexity. The complexity of the algorithm is bounded in two ways. First, the algorithm converges fast. For a network of 1000 peers after 100 query cycles, FIG. 4 depicts the residual $\|t^{(k=1)}-t^{(k)}\|_1$. Clearly, the algorithm has converged after less than 10 iterations, i.e., the computed global trust values do not change significantly any more after a low number of iterations. In the distributed version of the inventive algorithms (Algorithm 3), this corresponds to less than ten exchanges of updated trust values among peers. Second, the number of local trust values that a peer reports can be limited. In a modified version of Algorithm 3, each peer reports a subset of its total set of local trust values. Simulations have shown this modified algorithm performs comparably to the version of Algorithm 3 presented above, where peers report all of their local trust values.

Securing the Algorithm. In the algorithm presented in the previous section, each peer i computes and reports its own trust value $t_i$. Malicious peers can easily report false trust values, subverting the system. The present invention addresses this problem in two ways. First, the condition is imposed that the current trust value of a peer must not be computed by and reside at the peer itself, where it can easily become subject to manipulation. Rather, a different peer in the network computes the trust value of a peer. Second, because malicious peers could return wrong results when asked to compute a peer's trust value, the trust value of each peer in the network is computed by more than one other peer.

In the secure version of the distributed trust algorithm, M peers, termed score managers of a peer i, compute the trust value of a peer i. If a peer needs the trust value of peer i, it can query all M score managers for the value. In one embodiment of the present invention, a majority vote on the trust value settles conflicts arising when more than one malicious peers are among the score managers presents faulty trust values that deviate from the correct trust value presented by non-malicious score managers.

In one embodiment of the present invention, score managers are assigned using a distributed hash table (DHT), such as CAN [Ratnasamy et al. "A scalable content-addressable network," *Proceedings of ACM SIGCOMM*, August 2001] or Chord [Stoica et al., "Chord: A scalable peer-to-peer lookup service for interne applications," Proceedings of the 2001 Conference on Applications, Technologies, Architectures, and Protocols for Computer Communications, pages 149-160, ACM Press, 2001]. DHTs use a hash function to deterministically map keys such as file names into points in a logical coordinate space. At any time, the coordinate space is partitioned dynamically among the peers in the system such that every peer covers a region in the coordinate space. Peers are responsible for storing (key, value) pairs the keys of which are hashed into a point that is located within their region. It will be appreciated that other means of assigning score managers can be assigned and all such methods are within the scope of the present invention. For example, in one embodiment, score managers are selected from the set of trusted peers.

In one approach in accordance with the present invention, a peer's score manager is located by hashing a unique ID of the peer, such as its IP address and TCP port, into a point in the DHT hash space. The peer that currently covers this point as part of its DHT region is appointed as the score manager of that peer. All peers in the system that know the unique ID of a peer can thus locate its score manager. Algorithm 3 can be modified such that it can be executed by score managers.

Figure 5:
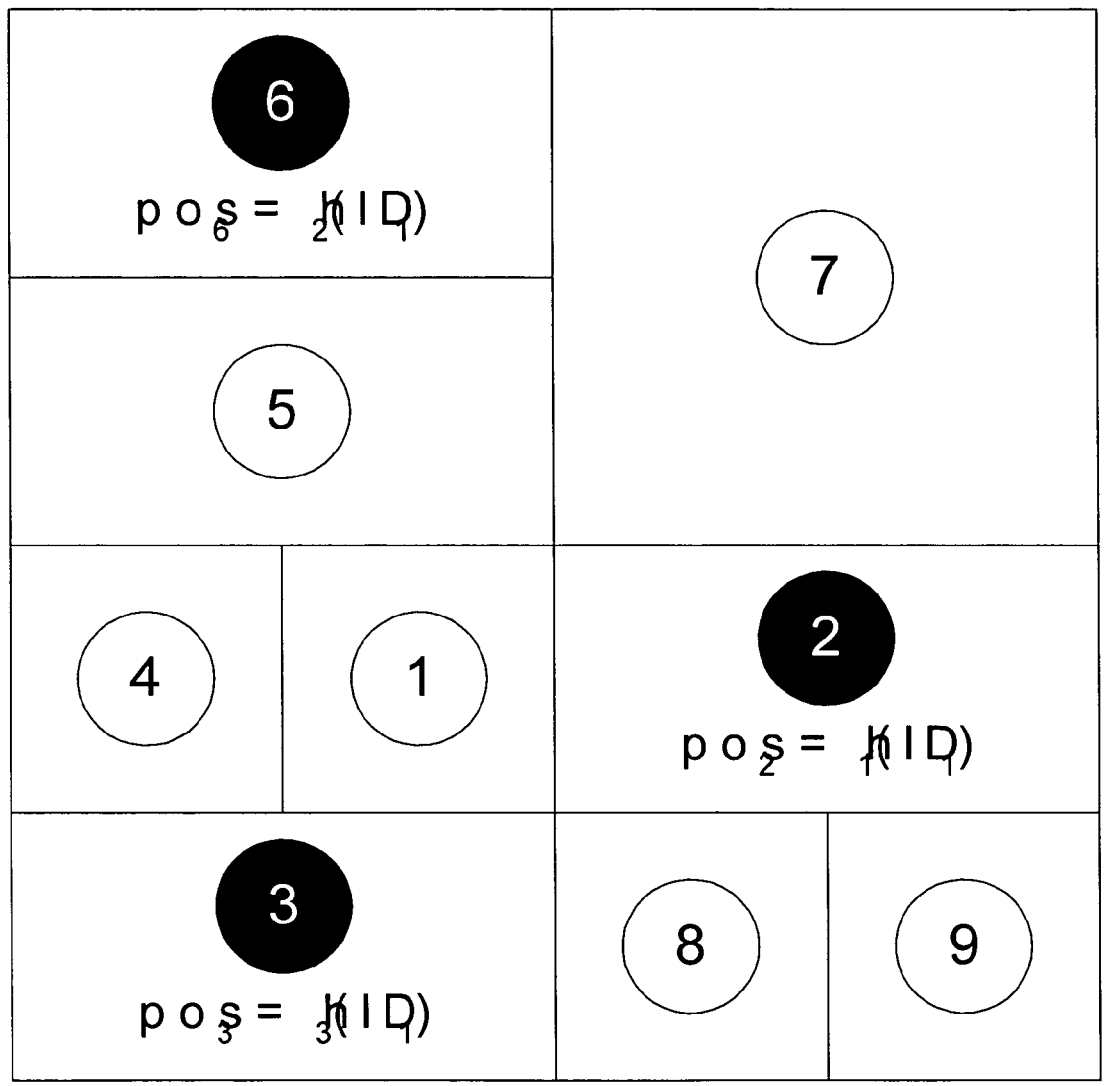
FIG. 5 illustrates how mother nodes in a peer-to-peer network are assigned daughter nodes using a distributed hash table in accordance with some embodiments of the present invention.

As an example of the DHT function, consider the CAN in FIG. 5. Peer 1's unique ID, $ID_1$, is mapped into points covered by peers 2, 3 and 6, respectively, by hash functions $h_1$, $h_2$ and $h_3$. Thus, these peers become peer 1's score managers. To cope with the inherent dynamics of a P2P system, one embodiment of the present invention relies on the robustness of a well-designed DHT. For example, when a score manager leaves the system, it passes on its state (i.e., trust values or ongoing trust computations) to its neighbor peer in the DHT coordinate space. DHTs also introduce replication of data to prevent loss of data (in this case, trust values) in case a score manager fails.

Algorithm Description. The secure algorithm to compute a global trust vector will now be described with reference to FIGS. 2, 3, 13 and 14, using the following definitions. In particular, FIG. 2 describes a peer-to-peer network 200 in which nodes 202. Interactions between nodes 202 in the network are designated by arrows. That is, an arrow drawn from a first node to a second node indicates that the first node has shared information with the second node. The exact nature of the information exchange will depend on the type of P2P network. For example, it could be that the second node has downloaded a file from the first node, the first node could have sent the second node an e-mail or other form of message, etc. As illustrated in FIG. 2, information has not been shared between all possible nodes 202 in P2P network 200. For example, node 202-5 has shared information with node 202-4, but not vice versa, and node 202-4 and node 202-6 have not shared any information with each other at all.

Figure 14:
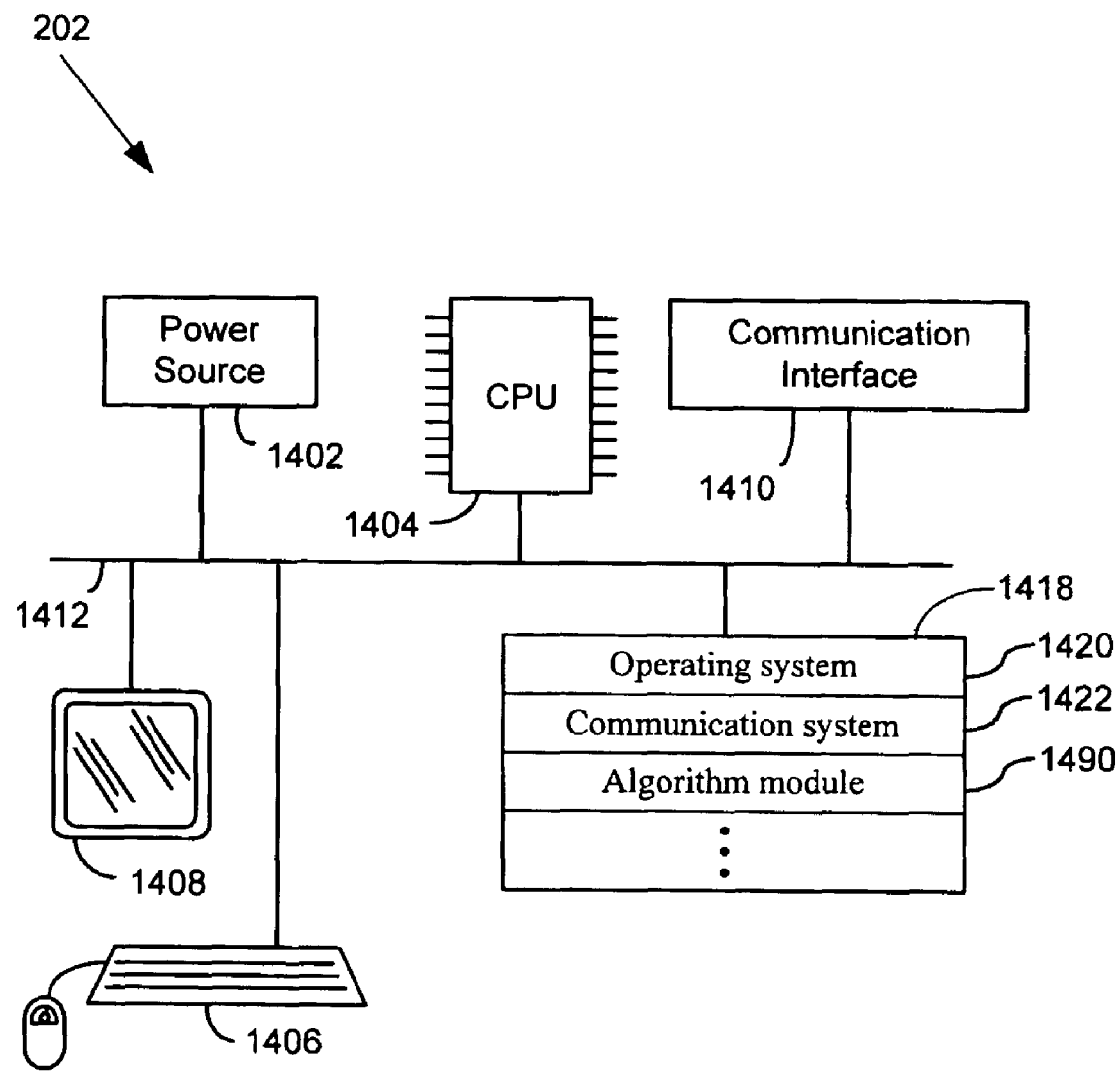
FIG. 14 illustrates the architecture of a node in accordance with some embodiments of the present invention.

FIG. 14 illustrates a block diagram of a node 202 in accordance with one embodiment of the present invention. Node 202 preferably includes at least one data processor or central processing unit (CPU) 1404, a memory 1418, a communication interface 1410 for communicating with other nodes 202 in the peer-to-peer network, a power source 1402 configured to be coupled to a source of power, a user interface comprising a display 1408, and keyboard/mouse 1406, and at least one bus 1412 that interconnects these components. Memory 1418 preferably includes high-speed random access memory and may include non-volatile memory, such as one or more magnetic disk storage devices. Memory 1418 preferably stores an operating system 1420, such as LINUX, UNIX or WINDOWS, that includes procedures for handling basic system services and for performing hardware dependent tasks. Memory 1418 also preferably stores communication procedures 1422 used for communicating with other nodes 202 in a peer-to-peer network. Memory 1418 also stores an algorithm module for performing the novel algorithms and methods of the present invention.

FIG. 2 further illustrates data structures and modules that are stored in the memory 1418 of each node 202. In particular, each node 202 has a unique identifier 204 such as the node's IP address and/or TCP port identifier. Each node 202 further stores a hash function 206 that can be used as follows. Each peer 202 has a number M of score managers. In some embodiments of the present invention the DHT coordinates of the M score managers are determined by applying a set of one-way secure hash functions $h_0, h_1, \ldots, h_{M-1}$ to the peer's unique identifier 204. $pos_i$ are the coordinates of peer i in the hash space. Each peer further stores the local trust values $\vec{c}_i$ 208 that the peer has for other nodes in the network. These local trust values indicate the degree of trust that the node has in other nodes in the network. For example, the local trust values 208 of node 202-1 indicate the degree of trust that node 202-1 has in other nodes in the network.

Since each peer also acts as a score manager, it is assigned a set of daughters $D_i$—the set contains the indexes of peers whose trust value computation is covered by the peer. Thus, each node 202 stores a data structure for each such daughter node i. As a score manager, peer 202 maintains the opinion vector 212 $c_d^i$ of its daughter peer d (where $d \in D_i$) at some point in the algorithm. Also, peer i will learn the identity of the peers to which the daughter node has sent information ($A_d^i$) and the identity of the peers from which the daughter node has received information ($B_d^i$). The identity of these peers is stored as element 214 in data structure 210. Peer i will also receive trust assessments from peers referring to its daughter peer d. For any given peer k, the trust assessment of peer d by peer k is the global trust of k ($t_k$) weighted by the trust that k has in d ($c_{dk}$), which can be expressed as ($c_{dk}t_k$). These trust assessments are stored in element 216 of data structure 210.

Upon kicking off a global trust value computation, its daughter peer d is supposed to submit its trust assessments on other peers to its score manager, providing the score manager with $B_d^i$.

Figure 3A:
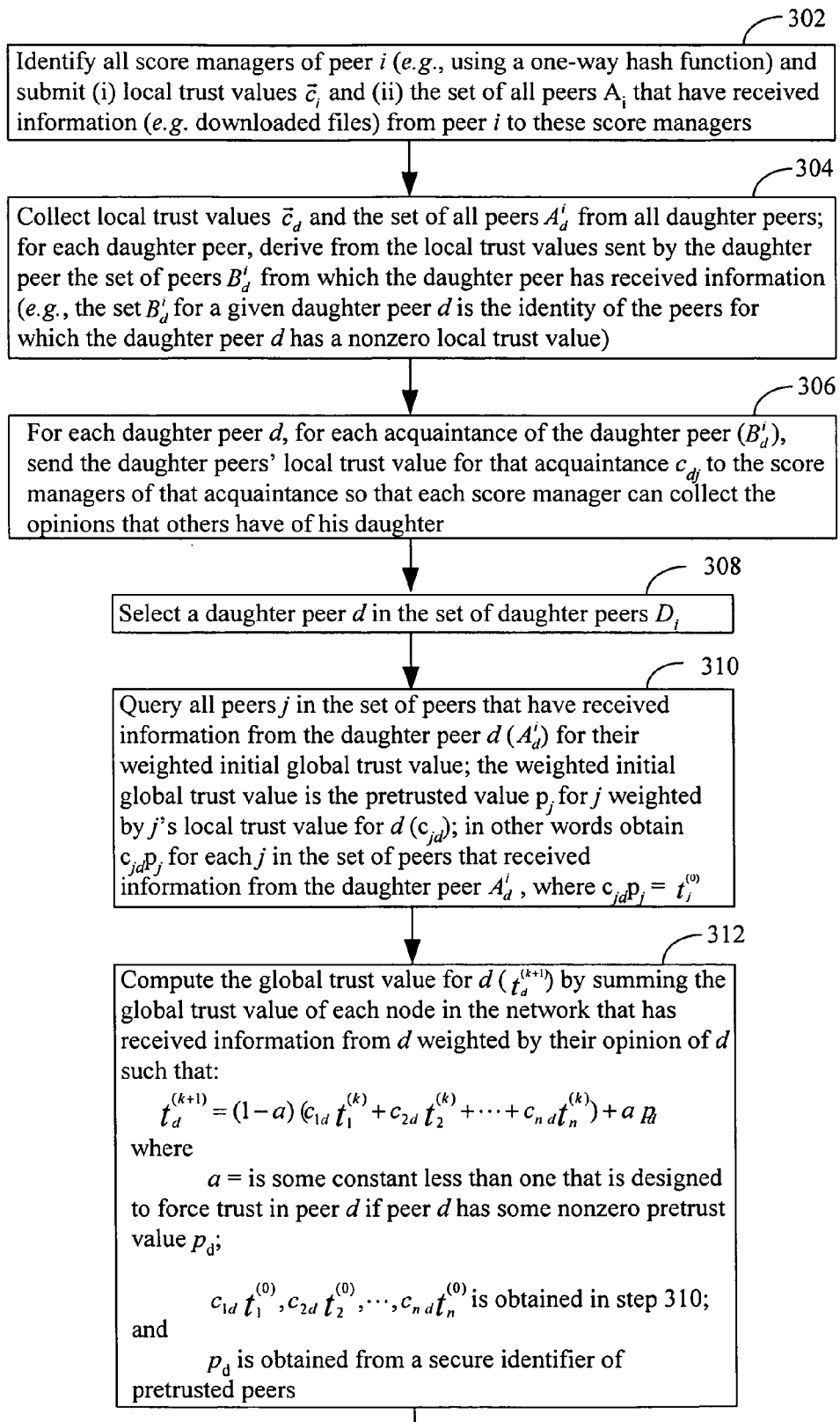
FIG. 3 depicts a process for computing global trust values for each node in a decentralized peer-to-peer network in accordance with some embodiments of the present invention.
Figure 3B:
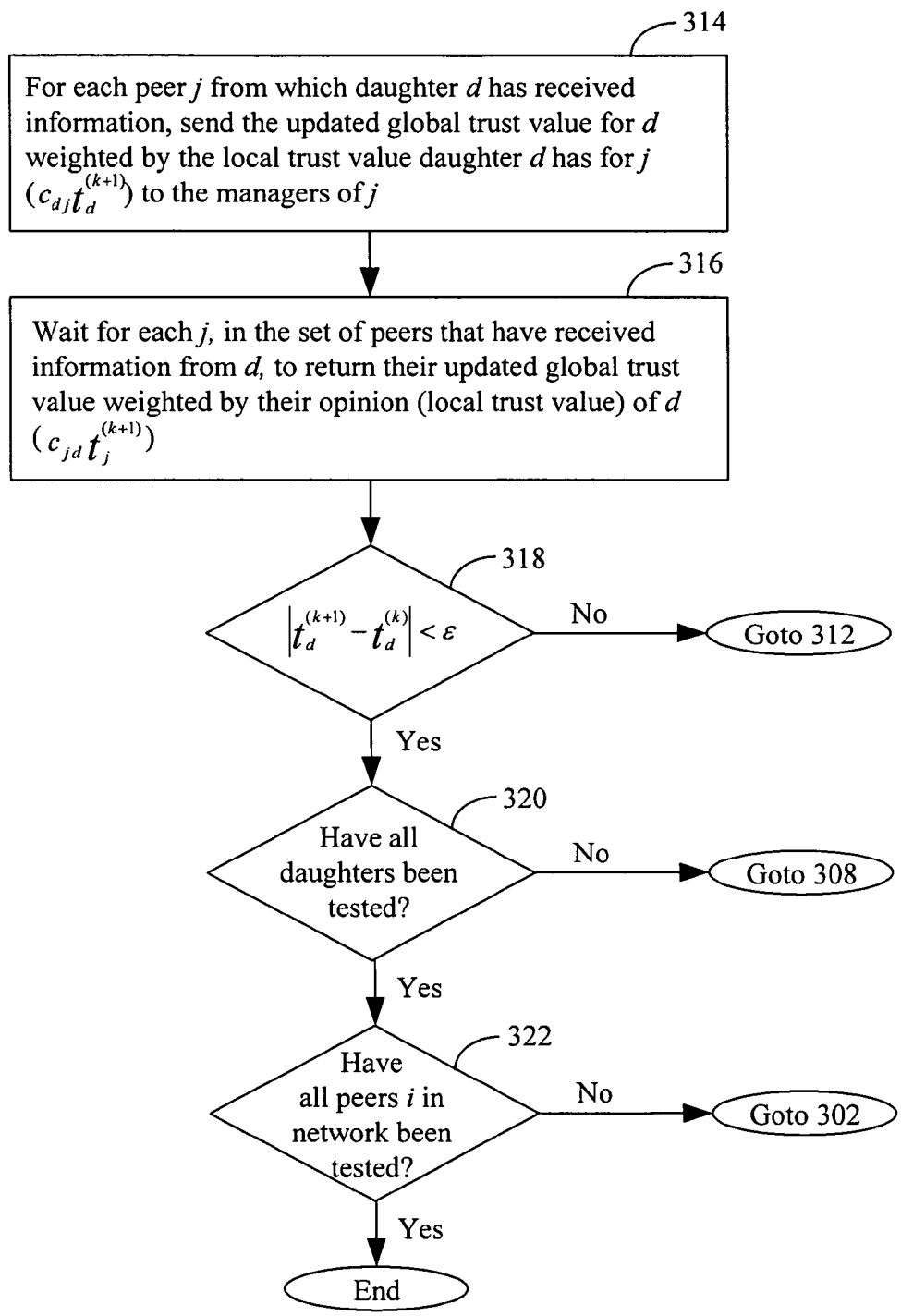

The distributed algorithm is illustrated in FIG. 13. FIG. 3 provides a flow chart that corresponds to the algorithm depicted in FIG. 13. The process is initiated in step 302 for a given peer i. In the embodiment illustrated in FIG. 13, peer i uses a one-way hash function to identify its score managers (mothers). Upon such discovery, peer i sends two types of information to the mothers. The first type of information sent is the local trust values $c_i$. These local trust values are the normalized opinions that peer i has of every other node that in the network from which peer i has received information. In the embodiment illustrated in FIG. 2, these local trust values are stored in the memory as data element 208. Second, peer i sends to its score managers the set of nodes $A_i$ that have downloaded information from peer i. In the embodiment illustrated in FIG. 2, these data elements are stored as data element 220.

Each peer (node) i has mother nodes. Correspondingly, each peer i has daughter nodes d. Step 304 is essentially the reciprocal of step 302. In step 304, peer i collects the local trust values of each of it daughter peers. The local trust values of a given daughter peer d are denoted $\vec{c}_d$. Further, for each daughter peer d of peer i, the identity of all nodes that have received information from the daughter peer d, $A_d^i$, is collected. The set of peers $B_d^i$ that a given daughter peer d has received information from can be derived from the local trust values of its daughter peer $\vec{c}_d$. Essentially any node in this vector that has a nonzero value is a member of $B_d^i$.

In step 306, peer i processes each daughter peer. For each daughter peer d, peer i sends out the local trust value $c_{dj}$ for each peer j that the daughter d has received information from (each peer in the set $B_d^i$) to the score managers of such peers j. This allows each store manager to collect the trust values for the daughter. As described above, these trust values are stored as element 216 is data structure 210 of memory 202 of the manager node.

Once steps 302 through 306 have been completed, each manager has all the information needed to compute the global trust value for its daughter nodes. These global trust values are computed using steps 308 through 318.

In step 308, a daughter node (peer) d of peer i is selected. In step 310, the manager node (peer i) queries all peers j in the set of peers that have received information from the daughter peer $A_d^i$ for their weighted initial global trust values. A weighted initial global trust value from j is the pretrusted value $p_j$ of peer j weighted by j's local trust value for the daughter node ($c_{jd}$). Recall that $p_j$ has some value if j is a pretrusted peer and is zero otherwise. Thus, step 310 is essentially is a bootstrap step to get an initial set of trust values $c_{1d}t_1^{(0)}, c_{2d}t_2^{(0)}, \ldots, c_{nd}t_n^{(0)}$. Alternatives to step 310 are possible. For example, the pretrusted peers themselves could actually initiate steps 308-318.

In step 312, peer i computes the global trust value for a daughter d using the information obtained in preceding steps. The computation is simply the summation of the trust of each node n that has interacted with daughter d ($c_{nd}$) weighted by the global trust value of node n ($t_n$): $c_{1d}t_1^{(k)}, c_{2d}t_2^{(k)}, \ldots, c_{nd}t_n^{(k)}$. However, in a preferred embodiment, in order to prevent malicious collectives, the computation is biased toward the daughter node by a probability a if the daughter node is a pretrusted peer (i.e., has a nonzero value $p_d$, where a is less than 1). Thus, the global trust value for daughter node in the $k^{th}$ iteration of step 313 becomes $t_d^{(k+1)}=(1-a)(c_{1_d}t_1^{(k)}, c_{2_d}t_2^{(k)}, \ldots, c_{n_d}t_n^{(k)})+aP_d$. Note the source of $p_d$ has not been identified. For security purposes, such values are typically not stored by daughter nodes. There are many ways in which a manager can determine the value $p_d$ for its daughter nodes. For example, in one embodiment, values $p_d$ are listed at a specific web site location and peer i (the manager of daughter node d) looks this value up during the execution of step 312. In the exemplary embodiment illustrated in FIG. 2, the location or method by which such values $p_d$ can be found is held stored in the memory of each peer as element 218.

In step 314, the global trust value compute in step 312 is sent to the appropriate nodes in the peer-to-peer network. In particular, for each peer j from which daughter d has received information ($B_d^j$), the updated global trust value for daughter d ($t_d^{(k+1)}$) weighted by the local trust value that daughter d has for j ($c_{d_j}$) is sent to the managers of peer j. In other words, $C_{i_d}t_d^{(k+1)}$ is sent to the manager of j by the manager of d.

Step 316 is the reciprocal of step 314. In step 316, peer i waits for each j in the set of peers that have received information from peer i's daughter node d ($A_d^i$) to return their updated global trust values weighted by their opinion of d ($c_{d_i}t^{(k+1)}$).

Step 318 is a test for convergence. If $|(t_d^{(k+1)}-t_d^{(k)}|<\epsilon$ (318—Yes) where $\epsilon$ is some threshold value, then the global trust value for daughter d has been determined and process control can pass to step 320. If not (318—No), the process control passes to step 312 and another iteration of the global trust value for daughter node d is performed. Note that in the first iteration of steps 312 through 316, only $t_d^{(0)}$ had been computed. Thus, in the first instance of step 318, the result is automatically negative (318—No).

In step 320, the question is asked whether the global trust values for all daughter nodes for the given peer i have been computed. If not (320—No), process control passes to step 308 where another daughter peer d of peer i is selected from the set $D_i$. If so (320—Yes), process control passes to step 322. In step 322, the question is asked whether all peers i have been tested. In other words, a determination is made as to whether each node in the network computed the global trust values for its daughter nodes. If so (322—Yes), the process ends. If not, process control passes to step 302 where another peer i is selected. It will be appreciated that in practice, the loop defined by step 322 is merely shown so that the algorithm can be better understood. In practice, each peer i analyzes its daughter nodes d in a manner that is not dependent upon whether other peers have analyzed their daughter nodes. Thus, in some embodiment, each peer i can compute the global trust values of its daughter nodes at the same time.

There are a number of advantages to the algorithm. The first advantage is anonymity. It is not possible for a peer at a specific coordinate to find out the peer ID for whom it computes the trust values—hence malicious peers cannot increase the reputation of other malicious peers. The second advantage is randomization. Peers that enter the system cannot select at which coordinates in the hash space they want to be located (this should be a property of a well-designed DHT)—hence it is not possible for a peer to, for example, compute the hash value of its own ID and locate itself at precisely this position in the hash space to be able to compute its own trust value. The third advantage is redundancy. Several score managers compute the trust value for one peer. To assign several score managers to a peer, several multi-dimensional hash functions can be used. Peers in the system still take over a particular region in the coordinate space, yet now there are several coordinate spaces, each of which is created by one multidimensional hash function. A peer's unique ID is thus mapped into a different point in every multi-dimensional hash space.

A couple of points are of interest. First, the issue of secure score management in P2P networks is an important problem, with implications for reputation management, incentive systems, and P2P micropayment schemes, among others. An extended discussion of secure score management in P2P networks, and various concrete score management schemes (including a variant of the one presented above), is given in Yang et al., Secure Score Management for P2P Systems, Technical report, Stanford University, 2003, which is hereby incorporated by reference in its entirety. Secure score management scheme is discussed because some secure score management scheme is useful in the inventive algorithms. However, it should be noted that the core algorithm can be used with many different secure score management schemes. Second, the secure protocols proposed here and in Yang et al. describe how to use large collections of entities to mitigate singular or group-based manipulation of the protocol. These protocols are not secured in the traditional sense; rather, we can show that the probability is small that a peer is able to get away with misreporting a score. This is discussed further in Yang et al.

Using Global Trust Values. There are two clear ways to use these global trust values in a peer-to-peer system. The first is to isolate malicious peers from the network by biasing users to seek information (e.g., download files, receive e-mails, etc.) from reputable peers. The second is to encourage peers to share information by rewarding reputable peers. These uses will be discussed in turn below.

Isolating Malicious Peers. When peer i issues a query, the network can use the trust values $t_j$ to bias the user towards downloading from more reputable peers. One way to do this would be to have each peer download from the most highly trusted peer who responds to its query. However, such a policy leads to the most highly trusted peers being overloaded. Furthermore, since reputation is built upon sharing authentic files, this policy does not enable new peers to build up reputation in the system.

A different strategy is to select the peers from whom to download probabilistically based on their trust values. In particular, the type probability can be set such that a peer will download a file from responding peer j with a probability directly proportional to the trust value $t_j$ of peer j. Such a policy limits the number of unsatisfactory downloads on the network, while balancing the load in the network and allowing newcomers to build reputation. It should be noted here that peers can choose to bias their choice of download by a convex combination of the global trust values and their own local trust assessments of other peers (and use the trust values given by the vector $\vec{t}$ personal=$d\vec{t}+(1-d)\vec{c}$, where d is a constant between 0 and 1. This way, a peer can avoid downloading from a peer that has given it bad service, even if it gives the rest of the network good service.

Incenting Freeriders to Share. The system can reward peers with high trust values. For example, reputable peers may be rewarded with increased connectivity to other reputable peers, or greater bandwidth. Rewarding highly trusted peers has a twofold effect. First, it gives users an incentive to share files, since a high global trust value can only be achieved by sharing authentic files. In the current Gnutella network, less than seven percent of the peers are responsible for over fifty percent of the files, and as many as twenty-five percent of peers on the network share no files at all. See, for example, Saroiu et al., "A Measurement Study of Peer-to-Peer File Sharing Systems," Proceedings of Multimedia Computing and Networking 2002 (MMCN '02), San Jose, Calif., USA, January 2002, which is hereby incorporated by reference in its entirety. Incentives based on trust values should reduce the number of free riders on peer-to-peer networks. Some such incentives are discussed in Kamvar et al., "Incentives for Combatting Freeriding on P2P Networks," Technical report, Stanford University, 2003, which is hereby incorporated by reference in its entirety.

Second, rewarding highly trusted peers gives non-malicious peers an incentive to delete inauthentic files that they may have accidentally downloaded from malicious peers, actively keeping the network tidy. This makes it more difficult for inauthentic files to replicate in the system.

Experiments. In this section, the performance of the scheme as compared to a P2P network where no reputation system is implemented is compared. This comparison demonstrates the scheme's performance under a variety of threat models. The findings are based on typical P2P network model: interconnected, file-sharing peers are able to issue queries for files, peers can respond to queries, and files can be transferred between two peers to conclude a search process. When a query is issued by a peer, it is propagated by broadcast with hop-count horizon throughout the network (in the usual Gnutella way), peers that receive the query forward it and check if they are able to respond to it. The peers are interconnected by a power-law network, a type of network prevalent in real-world P2P networks. See for example, Ripeanu and Foster, "Mapping the Gnutella Network—Macroscopic Properties of Large-scale P2P Networks and Implications for System Design," Internet Computing Journal 6(1), 2002, which is hereby incorporated by reference in its entirety. In the simulation, the network consists of good nodes (normal nodes, participating in the network to download and upload files) and malicious nodes (adversarial nodes, participating in the network to undermine its performance). In the experiments described below, different threat models are considered, where a threat model describes the behavior of a malicious peer in the network. Threat models will be described in more detail in corresponding experiments. Note also that, some good nodes in the network are appointed as highly trusted nodes. Interactions between peers—i.e., which queries are issued and which queries are answered by given peers—are computed based on a probabilistic content distribution model. The detailed model will not be described here, it is presented in Schlosser and Kamvar, "Simulating P2P Networks," Technical report, Stanford University, 2003, which is hereby incorporated by reference. Briefly, peers are assumed to be interested in a subset of the total available content in the network, i.e., each peer initially picks a number of content categories and shares files only in these categories. It has been demonstrated that files shared in a P2P network are often clustered by content categories. Also, it is assumed that within one content category files with different popularities exist, governed by a Zipf distribution. When the simulator generates a query, it does not generate a search string. Instead, it generates the category and rank (or popularity) of the file that will satisfy the query. The category and rank are based on Zipf distributions. Each peer that receives the query checks if it supports the category and if it shares the file. Files are assigned probabilistically to peers at initialization based on file popularity and the content categories the peer is interested (that is, peers are likely to share popular files, even if they have few files). The number of files shared by peers and other distributions used in the model are taken from measurements in real-world P2P networks (Saroiu et al., "A Measurement Study of Peer-to-Peer File Sharing Systems," Proceedings of Multimedia Computing and Networking 2002 (MMCN '02), San Jose, Calif., USA, January 2002, hereby incorporated by reference in its entirety).

Simulation execution. The simulation of a network proceeds in simulation cycles: each simulation cycle is subdivided into a number of query cycles. In each query cycle, a peer i in the network can be actively issuing a query, inactive, or even down and not responding to queries passing by. Upon issuing a query, a peer waits for incoming responses, selects a download source among those nodes that responded and starts downloading the file. The latter two steps are repeated until a peer has properly received a good copy of the file for which it has been looking. Upon the conclusion of each simulation cycle, the global trust value computation is kicked off. Statistics are collected at each node, in particular, the number of authentic and inauthentic up- and downloads of each node are of interest. Each experiment is run several times and the results of all runs are averaged. An experiment is run until convergence to a steady state is seen (to be defined in the descriptions of the experiments), initial transient states are excluded from the data.

The base settings that apply for most of the experiments are summarized in Table 1. The settings represent a fairly small network to make the simulations tractable. However, larger networks have been simulated and the conclusions continue to hold. That is, schemes that do well in a small setting, do proportionately as well as the network is scaled up. The above-described settings put forth a pessimistic scenario with a powerful adversary: malicious peers connect to the most highly connected peers when joining the network, they respond to the top 20% of queries received and thus have a large bandwidth, they are able to communicate among themselves in most of threat models, and they make up a significant fraction of the network in most of the experiments described below. Yet, the experiments indicate that the inventive scheme works well in this hostile a scenario, and thus will also work in less hostile environments.

TABLE 1

Simulation settings

| | | |
|---|---|---|
| Network | # of good peers | 60 |
| | # of malicious peers | 42 |
| | # of pre-trusted peers | 3 |
| | # of initial neighbors of good peers | 2 |
| | # of initial neighbors of malicious peers | 10 |
| | # of initial neighbors of pre-trusted peers | 10 |
| | # Time-to-live for query messages | 7 |
| Content Distribution | # of distinct files at good peer i set of content categories supported by good peer I | file distribution as in Saroiu et al. |
| | # of distinct files at good peer i in category j | Zipf distribution over 20 content categories uniform random distribution over peer i's total number of distinct files |
| | top % of queries for most popular categories and files malicious peers respond to | 20% |
| | top % of queries for most popular categories and files pre-trusted peers respond to | 5% |
| | % of time peer i is up and processing queries | uniform random distribution over [0%, 100%] |
| | % of time pre-trusted peer i is up and processing queries | 1 |
| | % of up-time good peer i issues queries | uniform random |

TABLE 1-continued

Simulation settings

| | | |
|---|---|---|
| | | distribution over [0%, 50%] |
| | % of up-time pre-trusted peer i issues queries | 1 |
| Peer Behavior | % of download requests in which good peer I returns inauthentic file | 5% |
| | % of download requests in which malicious peer I returns inauthentic file | 0% (varied in some experiments) |
| | download source selection algorithm | probabilistic algorithm (varied in some experiments) |
| | probability that peer with global trust value 0 is selected as download source | 10% |
| Simulation | # of simulation cycles in one experiment | 30 |
| | # of query cycles in one simulation cycle | 50 |
| | # of experiments over which results are averaged | 5 |

As metrics, the number of inauthentic file downloads versus the number of authentic file downloads are of interest. If the computed global trust values accurately reflect each peer's actual behavior, the number of inauthentic file downloads should be minimized. Before considering the strengths of the inventive algorithms in suppressing inauthentic downloads in a P2P network, a determination of whether it leads to unwanted load imbalance in the network will be made. Below, a precise definition on how global trust values are used in downloading files is provided.

Experiment: Load Distribution In A Trust-Based Network. In P2P networks, a natural load distribution is established by peers with more content and higher bandwidth being able to respond to more queries and thus having a higher likelihood of being chosen as download source for a file transfer. In some embodiments of the present invention, a high global trust value of a peer additionally contributes to a peer's likelihood of being chosen as download source. Possibly, this might lead a peer into a vicious circle of accumulating reputation by responding to many queries, thus being chosen even more frequently as download source in the future, thus accumulating even more reputation. In a non-trust based system, this situation does not occur: From responding peers, a peer usually is randomly picked and selected as download source, somewhat balancing the load in the network. In the following, integration of load-distributing randomization into the inventive scheme is over interest. In the experiments summarized by FIGS. 6 and 7, load distribution performance of a network in which the inventive scheme is activated is studied. Two different trust-based algorithms for selecting download sources among peers responding to a query are considered, a deterministic algorithm and a probabilistic algorithm.

If $\{t_0, t_1, \ldots, t_{R-1}\}$ are the trust values of peers responding to a query, the deterministic and probabilistic algorithms proceed as follows.

(Deterministic algorithm) Choose the peer with the highest trust value $t_{max}$ among the peers responding to a query as down load source.

(Probabilistic algorithm) Choose peer i as download source with probability $$\frac{t_i}{\sum_{j=0}^{R} t_j}.$$

With a probability of 10%, select a peer j that has a trust value $t_j = 0$.

If a download returns an inauthentic file, delete the peer from the list of responding peers and repeat the algorithm. To give new peers in the network—which start with a global trust value of 0—the chance of building up reputation, the probabilistic algorithm assigns a fixed 10% chance to download from the group of responding peers with trust value 0. Otherwise, new peers would may never be chosen as download source, depriving them of the chance to become a trusted member of the network. A probability of 10% appears to strike a balance between granting malicious peers (which might also have a trust value of 0) too high a chance of uploading inauthentic files and allowing new peers to prove themselves as download sources of authentic files.

These deterministic download source selection algorithms are compared to a network where no reputation system is deployed, i.e., among peers responding to a query a peer is picked as download source entirely at random. The load distribution in these networks is examined. The existence of any malicious peers in this experiment is not assumed. Malicious peers would not impact the load distribution among good peers since downloading peers keep trying until they have found an authentic copy of a file (assuming they have enough bandwidth to do so)—hence malicious peers would add inauthentic uploads to the network, but not change anything about the number of authentic uploads from good peers.

Setup. A network consisting of 20 good peers, no pre-trusted peers and no malicious peers is simulated. Other than that, the standard settings in Table 1 apply. After running queries on the system for 20 query cycles, the load distribution is measured in FIGS. 6 and 7: for each peer 1-20 in the network, load share is depicted, i.e., the fraction of its uploads after a full run of the experiment divided by the total number of uploads in the entire network. The load distribution in a network using the deterministic download source selection algorithm (deterministic, right bars) is compared to the load distribution in a network using no reputation system at all (random, left bars) in FIG. 6, whereas a system employing the probabilistic download source selection algorithm (probabilistic, right bars) is compared to the non-trust based network (random, left bars) in FIG. 7.

Figure 6:
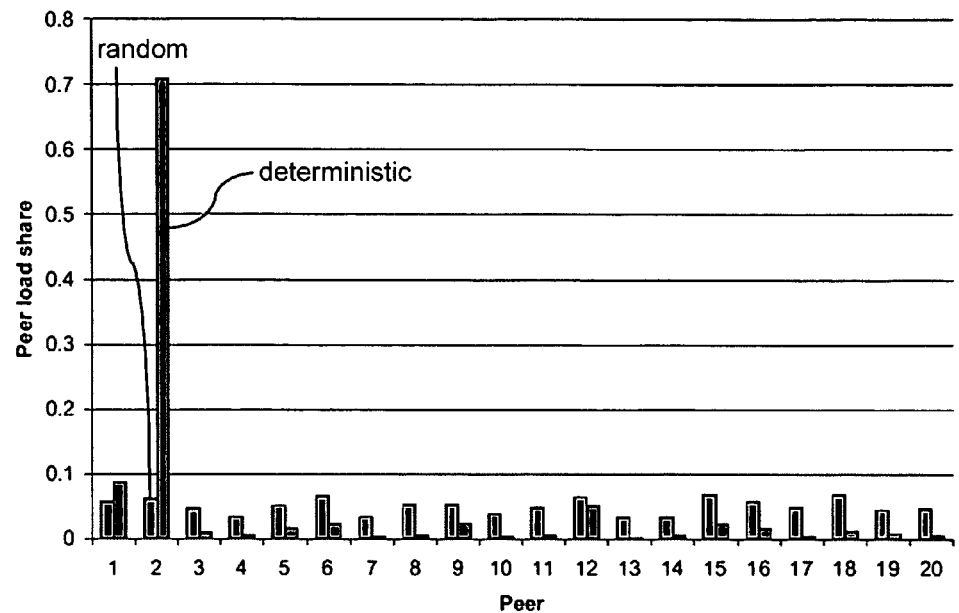
FIG. 6 illustrates load distribution in a network using deterministic download source selection versus a non-trust based network in accordance with some embodiments of the present invention.
Figure 7:
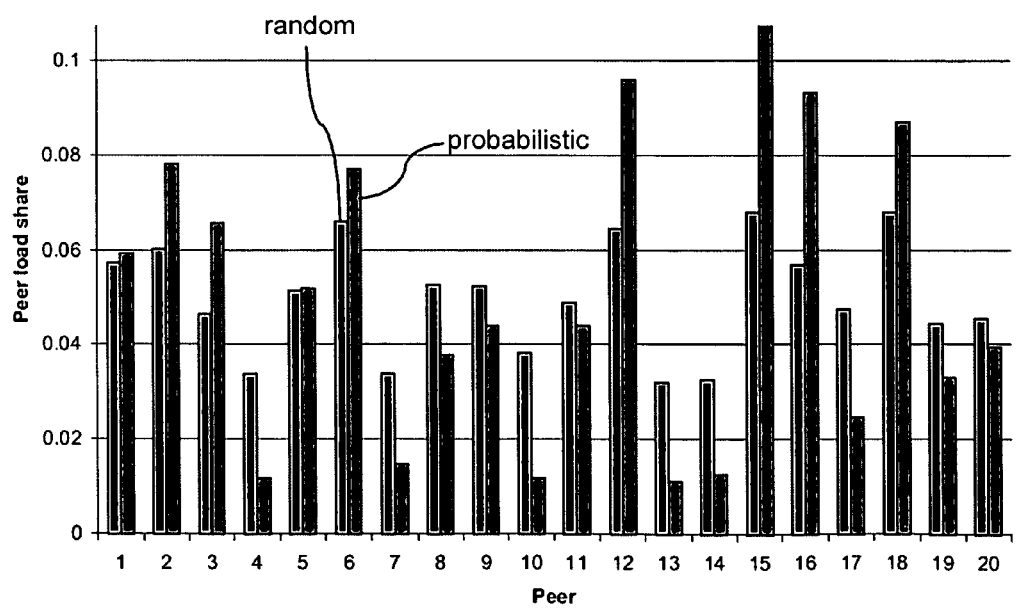
FIG. 7 compares load distribution in a network using probabilistic download source selection versus a non-trust based network in accordance with some embodiments of the present invention.

Discussion. Always choosing the responding peer with the highest global trust value as download source leads to a vast load imbalance in the network: popular peers do not stop accumulating trust value and gain further popularity. In FIG. 6, peer 2 will eventually become the download source for virtually all queries that it is able to answer. Also note that in each experiment run another peer turned out to be the most trusted peer. Choosing download sources probabilistically yields only a slight deviation in terms of individual load share of each peer from the case where trust values are not used to select download sources among responding peers, therefore leading to a much better natural load distribution in the network. In FIG. 7, peer 2 becomes the download source for 8% of all queries in the system, and many other peers participate in sharing the load, mainly determined by the number of and popularity of files the peers share. The measurements also show that the efficiency in suppressing inauthentic downloads does not vary between the two approaches. Thus, for the remaining experiments the probabilistic peer selection algorithm is used.

Threat Models. The performance of the algorithms of the present invention in suppressing inauthentic downloads is now tested against various threat models. Several strategies of malicious peers to cause inauthentic uploads even when our scheme is activated. In short, malicious peers operating under threat model A simply try to upload inauthentic files and assign high trust values to any other malicious peer they get to interact with while participating in the network. In threat model B, malicious peers know each other upfront and deterministically give high local trust values to each other. In threat model C, malicious peers try to get some high local trust values from good peers by providing authentic files in some cases when selected as download sources. Under threat model D, one group of malicious peers in the network provides only authentic files and uses the reputation they gain to boost the trust values of another group of malicious peers that only provides inauthentic files.

TABLE 2

Threat models and associated experiments

| Threat Model | File Upload Behavior | Local Trust Behavior | FIG. |
|---|---|---|---|
| A | Always upload inauthentic files. | Assign trust to peers which upload inauthentic files. | 8 |
| B | Always upload inauthentic files. | Assign trust to previously known malicious peer to form malicious collective. | 9 |
| C | Upload inauthentic files in f % of all cases. | Assign trust to previously known malicious peer to form malicious collective. | 10, 11 |
| D | Upload authentic files. | Assign equal trust share to all type B nodes in the network. | 12 |

Figure 8:
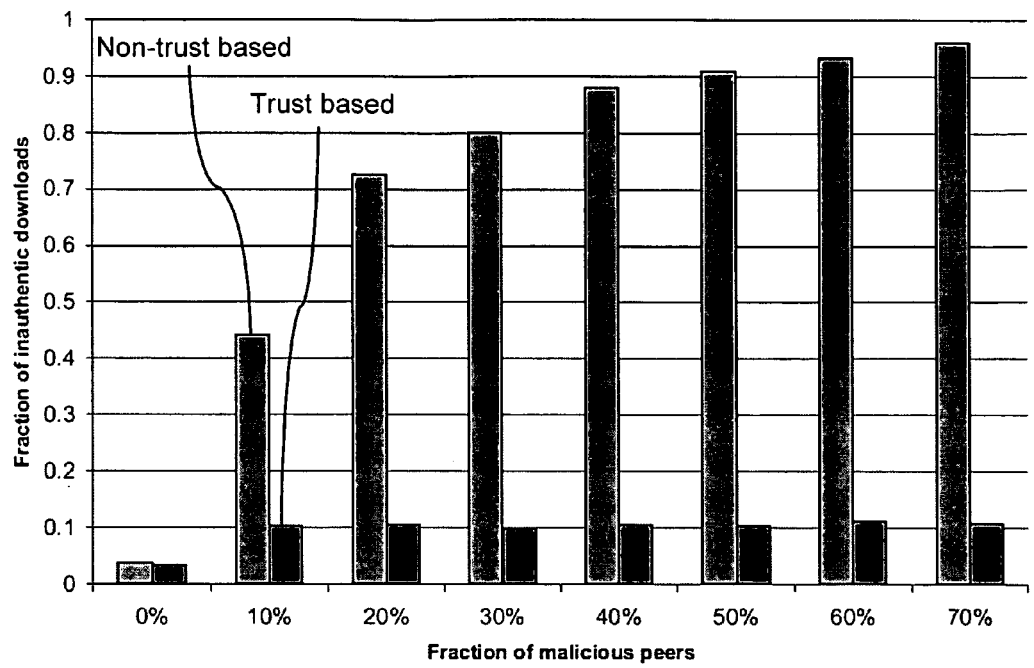
FIG. 8 illustrates reduction of inauthentic downloads by basing down-load source selection on global trust values in a network where independent malicious peers are present (left bars non-trust based, right bars trust based) in accordance with some embodiments of the present invention.

Threat Model A: Individual Malicious Peers. In this threat model, malicious peers always provide an inauthentic file when selected as download source. Malicious peers set their local trust values to be $S_{ij}$=inauth(j)−auth(j), i.e., malicious peers value inauthentic file downloads instead of authentic file downloads. Experimental setup: a network consisting of 63 good nodes, three of which are highly trusted nodes, is simulated with the standard settings from Table 1. In each experiment, a number of malicious peers is added to the network such that malicious nodes make up between 0% and 70% of all nodes in the network. For each fraction in steps of ten percent experiments are run and the results depicted in FIG. 8 (left bars non-trust based, right bars trust based). Upon joining the network, malicious peers connect to the ten most highly connected peers already in the network in order to receive as many queries traveling through the network as possible. In practice, P2P protocols such as the Gnutella protocol enable nodes to crawl the network in search of highly connected nodes. The experiments are run on a system where download sources are selected probabilistically based on global trust values and on a system where download sources are chosen randomly from the set of peers responding to a query. Bars depict the fraction of inauthentic files downloaded in one simulation cycle versus the total number of files downloaded in the same period of time. The results are averaged over the last ten query cycles in each experiment.

As the results indicate, in the absence of a reputation system, malicious peers succeed in inflicting many inauthentic downloads on the network. Yet, if the inventive scheme is activated, malicious peers receive high local trust values only from other malicious peers, and even that only occasionally—since malicious peers have to happen to get acquainted with each other through a file exchange. Because of their low trust values, malicious peers are rarely chosen as a download source that minimizes the number of inauthentic file downloads in the network. It is observed that a ten percent fraction of inauthentic downloads, mostly due to the fact that good nodes make mistakes once in a while and upload inauthentic files (for example, by not deleting a downloaded inauthentic file from their shared folders). Even if no malicious peers are present in the network, downloads are evaluated as inauthentic in five percent of all cases—this accounts for mistakes users make when creating and sharing a file, e.g., by providing the wrong meta-data or creating and sharing an unreadable file.

Note that, due to the fact that the current secure algorithm uses majority vote (although any voting scheme or related assessment technique can be used in the present invention), a cooperating malicious collective that comprises over 40% of the network will be able to influence the assignment of global trust values in the network during their computation. This is not represented in FIG. 8, which assumes that the trust values are computed correctly. However, it is unlikely that over 40% of the peers in a network are in a single malicious collective, unless the malicious collective is a result of pseudospoofing (a.k.a. the Sybil attack, Douceur, "The Sybil Attack," First IPTPS, March 2002, which is hereby incorporated by reference)), where a single adversary initiates thousands of peers onto the network. This type of attack can be avoided by imposing a cost of entry into the network. For example, a peer wishing to enter the network can be required to solve a puzzle that a computer cannot solve. See, for example, Aura et al., "Dos-resistant authentication with client puzzles," 8th International Workshop on Security Protocols, 2000; and the Captcha Project. http://www.captcha.net, each of which is hereby incorporated by reference in their entireties. Currently, YAHOO! requires a user to read some text from a JPEG file in order to open a YAHOO! Mail account.

Thus, in knowing that the inventive scheme is present in a system, malicious peers know that they have to gain a somewhat high local trust value in order to be considered as download sources. Therefore, strategies on how malicious peers can increase their global trust value despite uploading inauthentic files will be examined.

Since malicious peers cannot expect to receive any high local trust values from non-malicious peers, they can try to increase their global trust value by teaming up as a malicious collective. In the experiment depicted in FIG. 9, the number of malicious peers in the network is varied to assess their impact on the network's performance when they are aware of each other and form a malicious collective.

Figure 9:
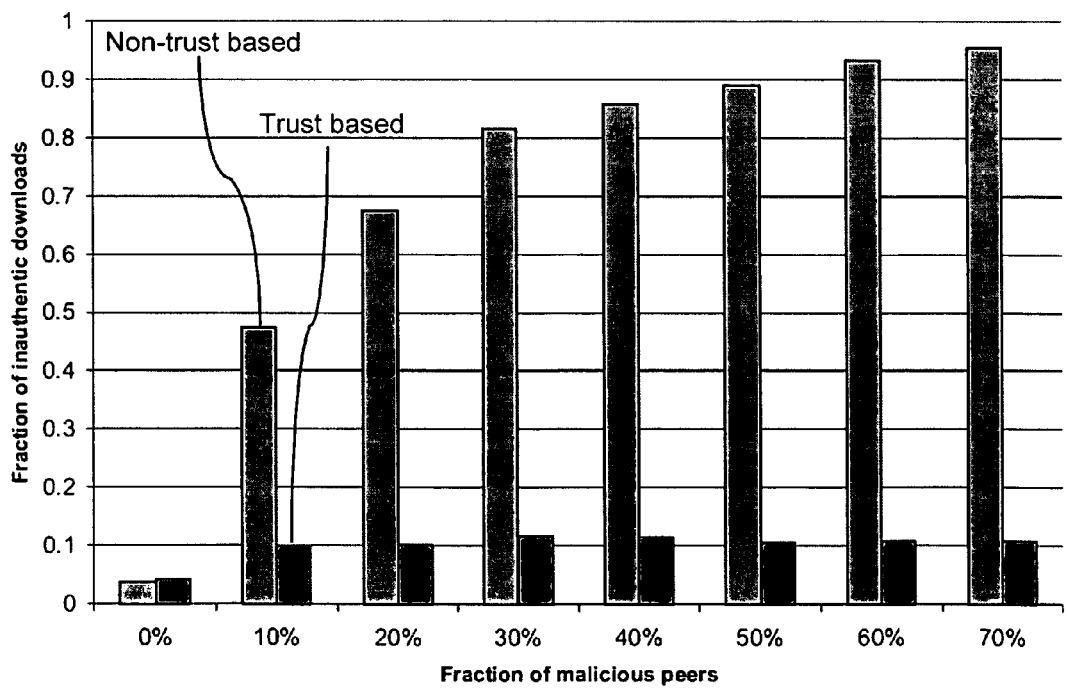
FIG. 9 illustrates trust-based reduction of inauthentic downloads in a network where a fraction of peers forms a malicious collective and always uploads inauthentic files in accordance with some embodiments of the present invention.

Threat Model B: Malicious Collectives. In this threat model, malicious peers always provide an inauthentic file when selected as download source. Malicious peers form a malicious collective by assigning a single trust value of 1 to another malicious peer in the network. Precisely, if M denotes the set of malicious peers in the network, each peer$_i$ ∈ M sets $$S peer_i peer_j = \begin{cases} 1 & \text{if } j = i+1 \\ 1 & \text{if } i = |M| \text{ and } j = 0 \\ 0 & \text{else} \end{cases}$$

which resembles a malicious chain of mutual high local trust values. In terms of the probabilistic interpretation of the inventive scheme, malicious peers form a collective out of which a random surfer or agent, once it has entered the collective, will not be able to escape, thus boosting the trust values of all peers in the collective. The experimental setup is as exactly described for threat model A, albeit with malicious nodes operating under threat model B. As shown in FIG. 9 (left bars non-trust based, right bars trust based), the experiments are run on a system where download sources are selected based on the global trust values and on a system where download sources are chosen randomly from the set of peers responding to a query.

The system performs well even if a majority of malicious peers is present in the network at a prominent place. The experiment clearly shows that forming a malicious collective does not decisively boost the global trust values of malicious peers. These peers are tagged with a low trust value and thus rarely chosen as download source. The system manages to break up malicious collectives through the presence of pre-trusted peers. If pre-trusted peers were not present in the network, forming a malicious collective in fact heavily boosts the trust values of malicious nodes. Under the presence of pre-trusted peers, the local trust values of malicious peers are significantly lower than those of good peers already after one simulation cycle. This minimizes the number of inauthentic downloads, and the numbers are virtually equal to the numbers in FIG. 8 when peers do not form a malicious collective. For example, with 40% of all peers in a network being malicious, around 87% of all file downloads will end up in downloading an inauthentic version of the file in a normal, non-trusted network. Upon activation of the inventive trust scheme, around ten percent of all file downloads return an inauthentic file.

Forming a malicious collective obviously does not increase the global trust values of malicious peers sufficiently in order for them to have impact on the network. This leaves malicious peers with one choice. They have to increase their local trust values by receiving positive local trust values from at least some good and trusted peers in the network. The experiment illustrated in FIG. 10 considers a strategy for malicious peers that is built on the idea that malicious peers try to get some positive local trust values from good peers.

Threat Model C: Malicious Collectives with Camouflage. In this threat model, malicious peers provide an inauthentic file in f % of all cases when selected as download source. Malicious peers form a malicious collective as described above. For the experimental setup, a network consisting of 53 good peers, 3 of which are pre-trusted peers, and 20 type C malicious peers is simulated applying the standard settings in Table 1. In each experiment, there is an application of a different setting of parameter f in threat model B such that the probability that malicious peers return an authentic file when selected as download source varies from zero percent to ninety percent. Experiments are run for each setting of parameter f in steps of ten percent. Running the experiments on both a non-trust based system and on our system yields FIG. 10. Bars (left bars, non-trust based, right bars, trust based) depict the fraction of inauthentic files downloaded in one simulation cycle divided by the total number of files downloaded in the same period of time.

Figure 10:
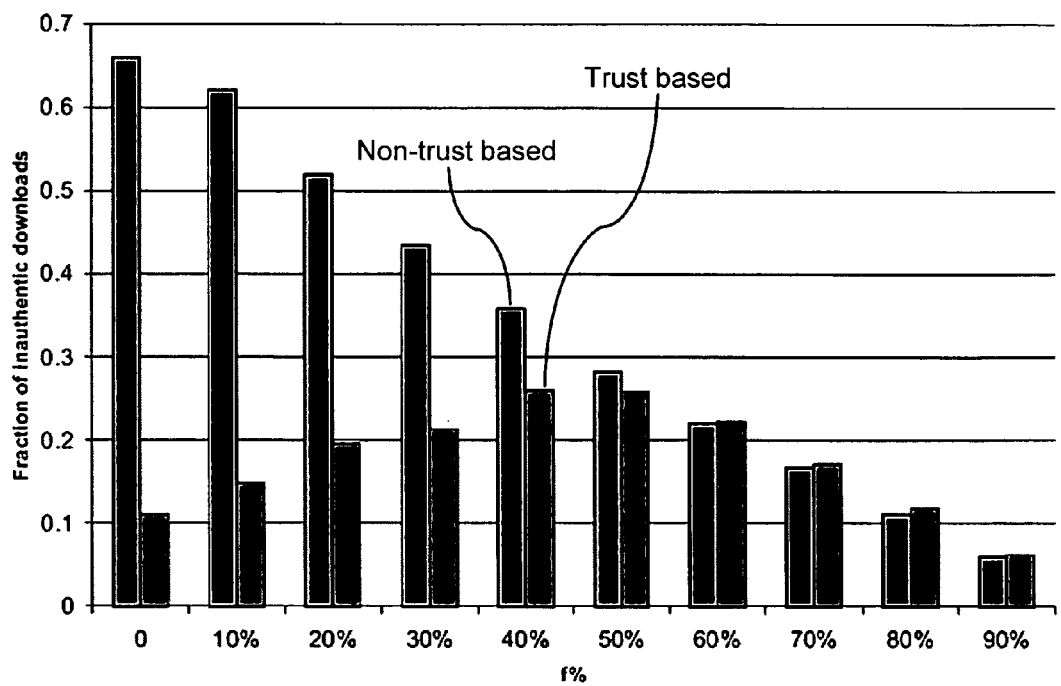
FIG. 10 illustrates trust-based reduction of inauthentic downloads in a network where a fraction of peers forms a malicious collective and returns authentic files with certain probabilities in accordance with some embodiments of the present invention.

Malicious peers that operate under threat model C attempt to gain positive local trust values from some peers in the network by sometimes providing authentic files. Thus, they will not be assigned zero trust values by all peers in the network since some peers will receive an authentic file from them. This in turn provides them with higher global trust values and more uploads—a fraction of which will be inauthentic. FIG. 10 shows that malicious peers have maximum impact on the network when providing 50% authentic files: 28% of all download requests return inauthentic files then. However, this strategy comes at a cost for malicious peers. They have to provide some share of authentic files, which is undesirable for them. First of all, they try to prevent the exchange of authentic files on the network, and in this strategy they have to participate in it; second, maintaining a repository of authentic files requires a certain maintenance overhead.

Figure 11:
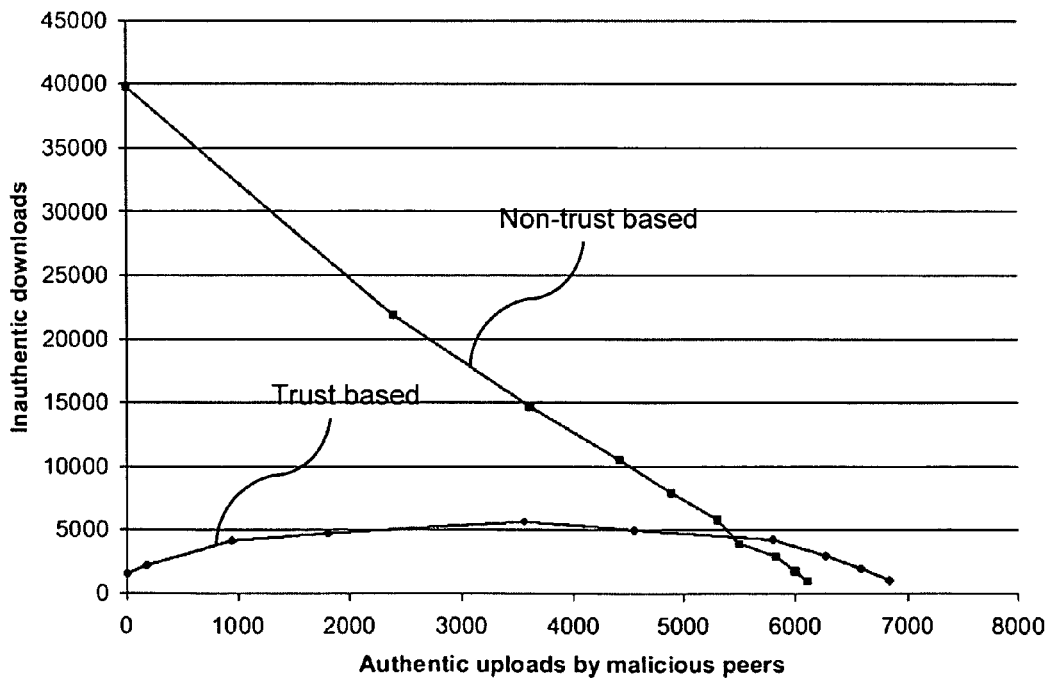
FIG. 11 illustrates inauthentic downloads versus authentic uploads provided by malicious peers with trust-based and non-trust based download source selection in accordance with some embodiments of the present invention.

FIG. 11 depicts the trade-off between authentic (horizontal axis) and inauthentic (vertical axis) downloads. Each scenario from FIG. 10 is represented by one data point in FIG. 11. For example, consider the fourth trust-based bar in FIG. 10, corresponding to f=30%. In this scenario, malicious peers provide 1850 authentic downloads and 5000 inauthentic ones in a particular run. More precisely, 30 query cycles are run, the first 15 query cycles are excluded, and the number of inauthentic and authentic downloads is then counted. Then a second run is executed, and the numbers from both runs is added. The value (1850, 5000) is plotted in FIG. 11 as the fourth data point (left to right) on the lower curve, representing the case when the inventive reputation scheme is used. The points on each curve represent increasing f values, from left to right.

In FIG. 11, malicious nodes would like to operate in the upper left quadrant, providing a high number of inauthentic downloads, and a low number of authentic downloads. However, the file sharing mechanism in place constrains malicious nodes to operate along one of the curves shown. Without the reputation scheme (top curve), malicious nodes can set f to a small value and move to the upper left quadrant. On the other hand, with the inventive scheme, malicious peers have no good choices. In particular, increasing f beyond 20% does not make much sense to malicious peers since the incremental authentic uploads they have to host outnumber the increase in inauthentic downloads. Moreover, for all settings of parameter f below 50%, malicious peers will lose all positive local trust values assigned by other peers in the long run—since on average they do provide more inauthentic than authentic files.

Notice that the lines in FIG. 11 cross at the lower right hand side of the graph. This does not show that the non-trust-based scheme works better for high values of f Rather, it shows that, when the trust-based scheme is implemented, malicious peers must upload more authentic files in order to be able to upload the same number of inauthentic files. This is the desired behavior.

The previous experiment has shown that malicious peers can increase their impact by partly concealing their malicious identity. Yet over time, their malicious identity will be uncovered and they lose their impact on the network. In the experiment illustrated in FIG. 12, a team effort strategy that malicious peers can use to work around this drawback is considered. Two different types of malicious peers are present in the network: malicious nodes of type B and of type D.

Threat Model D: Malicious Spies. In this threat model, malicious peers answer 0.05% of the most popular queries and provide a good file when selected as download source. Malicious peers of type D assign trust values of 1 to all malicious nodes of type B in the network. Precisely, if MB and MD denote the set of malicious type B peers resp. type D peers in the network, each peer$_i \in M_D$ sets $$S\text{peer}_i\text{peer}_j = \begin{cases} \frac{1}{\|M_B\|} & \text{if peer}_j \in M_B \\ 0 & \text{else} \end{cases}$$

A network consisting of 63 good peers, 3 of which are pre-trusted peers, and 40 (39%) malicious peers, divided into two groups of malicious type B and type D peers is simulated. Otherwise, the standard settings from Table 1 apply. In each experiment, a different number of type B and type D peers is considered. Configurations considered are: I. 40 type B, 0 type D peers II. 39 type B, 1 type D peer III. 36 type B, 4 type D peers IV. 35 type B, 5 type D peers V. 30 type B, 10 type D peers VI. 25 type B, 15 type D peers VII. 20 type B, 20 type D peers VIII. 15 type B, 25 type D peers IX. 10 type B, 30 type D peers X. 5 type B, 35 type D peers. From left to right, these data points are plotted in a graph (FIG. 12) that depicts the number of inauthentic file downloads versus the number of authentic file uploads provided by malicious peers, as in the previous experiment.

Malicious peers establish an efficient division of labor in this scheme. Type D peers act as normal peers in the network and try to increase their global trust value, which they will in turn assign to malicious nodes of type B providing inauthentic files. The malicious nature of type D peers will not be uncovered over time since these peers do not provide inauthentic files—hence they can continue to increase the global local trust values of type B peers in the network. An interesting configuration for malicious peers would be configuration I. Malicious peers provide a fairly low number of authentic downloads (around 100), yet achieve almost the same number of inauthentic downloads in the network as in other configurations with a higher share of authentic downloads by malicious peers. In any configuration though, the inventive scheme performs better than a system without trust-based download source selection. Also, this strategy would probably be the strategy of choice for malicious peers in order to attack a trust-based network. For example, by hosting 500 authentic file uploads in this strategy malicious peers achieve around 5000 inauthentic file downloads—as opposed to about 2500 inauthentic file downloads in the previous strategy, given the same effort on providing authentic uploads.

Other Threat Models. In this section, two slightly more nuanced threat models are considered Threat Model E: Sybil Attack. In this threat model, an adversary initiates thousands of peers on the network. Each time one of the peers is selected for download, it sends an inauthentic file, after which it disconnected and replaced with a new peer identity. This threat scenario simply takes advantage of the fact that the fudge-factor that allows previously unknown users to obtain a reputation can be abused. Essentially, because there is no cost to create a new ID, the adversary can dominate that pool (with ghost identities). Because 10% of all traffic goes to the 'unknown' pool, the malicious entity can behave arbitrarily without fear of losing reputation. To make matters worse, this kind of attack will prevent good peers from being able to garner a good reputation (they are so outnumbered that they will almost never be selected).

This threat scenario can be averted by imposing a cost to creating a new ID as previously discussed and described in Aura et al., "Dos-resistant authentication with client puzzles," 8th International Workshop on Security Protocols, 2000, which is hereby incorporated by reference in its entirety. For example, if a user must read the text off of a JPEG (or solve some other captcha [Captcha Project. http://www.captcha.net.) it will be costly for a single adversary to create thousands of users.

Threat Model F: Virus-Disseminators. This threat model is a variant of threat model C in which a malicious peer sends one virus-laden (inauthentic) copy of a particular file every 100th request. At all other times, the authentic file is sent. This is a threat scenario that is potentially not directly addressed by the inventive methods. The inventive procedures greatly reduce—but do not completely eliminate—corrupt files on a P2P network. This is useful on a filesharing network where executables are not shared. If executables are introduced that have potential to do great damage, then malicious peers can develop strategies to upload a few of them. But it should be noted that no reputation system to date claims to completely eliminate all corrupt files on a P2P network in an efficient manner. It should also be noted that the main problem on today's P2P networks is not the distribution of malicious executables (i.e. viruses), but rather the flooding of the network with inauthentic files. This is likely because today's P2P networks are mostly used to trade digital media, and relatively few users make use of these networks to share executables.

One skilled in the relevant art will recognize that there are many possible modifications of the disclosed embodiments that could be used, while still employing the same basic underlying mechanisms and methodologies. For example, the disclosed method of searching a document database may be implemented in the Internet or an Intranet environment. Various functions of the search engine system may be implemented with one or more computer servers distributed over multiple computer networks and over multiple geographical regions. Parameters other than the reuse count and the quality indicator may be stored in the cache and may be used for providing additional services by the search engine.

All references cited herein are incorporated herein by reference in their entirety and for all purposes to the same extent as if each individual publication or patent or patent application was specifically and individually indicated to be incorporated by reference in its entirety for all purposes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An apparatus comprising:
   a memory for storing a set of instructions for communicating with one or more nodes in a network; and
   a processor for:
   executing said set of instructions;
   identifying a set of possible source peers;
   identifying a set of global trust values that comprises a respective global trust value for one or more of the possible source peers;
   identifying a set of receiving peer local trust values that comprises a respective receiving peer local trust value for one or more of the possible source peers;
   combining the set of global trust values and the set of receiving peer local trust values; and
   selecting a source peer from the combined set.

2. The apparatus of claim 1, wherein the combining includes determining a respective trust value in the combined set by applying a first coupling factor to an associated value in the set of global trust values and applying a second coupling factor to an associated value in the set of receiving peer local trust values.

3. The apparatus of claim 2, wherein the first coupling factor and the second coupling factor sum to 1.

4. The apparatus of claim 2, wherein the first coupling factor is equal to the second coupling factor.

5. An apparatus comprising:
   a memory for storing:
   a set of global trust values that comprises a respective global trust value for one or more of a set of possible source peers, and
   a set of receiving peer local trust values that comprises a respective receiving peer local trust value for one or more of the possible source peers; and
   a processor for:
   combining the set of global trust values and the set of receiving peer local trust values, and
   selecting a source peer from the combined set.

6. The apparatus of claim 5 wherein said processor is also for determining a respective trust value in the combined set by applying a first coupling factor to an associated value in the set of global trust values and applying a second coupling factor to an associated value in the set of receiving peer local trust values.

7. The apparatus of claim 6, wherein the first coupling factor and the second coupling factor sum to 1.

8. The apparatus of claim 6, wherein the first coupling factor is equal to the second coupling factor.

9. An apparatus comprising:
   a memory for storing:
   a first set of instructions for identifying a set of possible source peers,
   a second set of instructions for identifying a set of global trust values, the set of global trust values including a respective global trust value for one or more of the possible source peers,
   a third set of instructions for identifying a set of receiving peer local trust values, the set of receiving peer local trust values including a respective receiving local peer trust value for one or more of the possible source peers,
   a fourth set of instructions for combining the set of global trust values and the set of receiving peer local trust values, and
   a fifth set of instructions for determining the source peer from the combined set; and
   a processor for executing said first set of instructions, said second set of instructions, said third set of instructions, said fourth set of instructions, and said fifth set of instructions.

10. The apparatus of claim 9, wherein the combining includes determining a respective trust value in the combined set by applying a first coupling factor to an associated value in the set of global trust values and applying a second coupling factor to an associated value in the set of receiving peer local trust values.

11. The apparatus of claim 10, wherein the first coupling factor and the second coupling factor sum to 1.

12. The apparatus of claim 10, wherein the first coupling factor is equal to the second coupling factor.

* * * * *